(12) United States Patent
Yamauchi et al.

(10) Patent No.: US 6,901,535 B2
(45) Date of Patent: May 31, 2005

(54) INFORMATION PROCESSING APPARATUS, DEFECT ANALYSIS PROGRAM, AND DEFECT ANALYSIS METHOD

(75) Inventors: Nobuyuki Yamauchi, Yokohama (JP); Natsumi Matsumoto, Yokohama (JP); Akira Sawaoka, Yokohama (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 660 days.

(21) Appl. No.: 09/752,837

(22) Filed: Dec. 28, 2000

(65) Prior Publication Data

US 2001/0014958 A1 Aug. 16, 2001

(30) Foreign Application Priority Data

Dec. 28, 1999 (JP) .......................................... P11-375859
Dec. 26, 2000 (JP) ..................................... P2000-396112

(51) Int. Cl.⁷ ............................................... G06F 11/00
(52) U.S. Cl. ......................................... 714/38; 717/124
(58) Field of Search .............................. 714/38, 37, 39, 714/45; 717/124, 126, 128

(56) References Cited

U.S. PATENT DOCUMENTS

| | | | | |
|---|---|---|---|---|
| 4,984,239 A | * | 1/1991 | Suzuki et al. ................ 714/703 |
| 5,461,609 A | * | 10/1995 | Pepper ......................... 370/218 |
| 5,488,648 A | * | 1/1996 | Womble ....................... 379/13 |
| 5,522,036 A | * | 5/1996 | Shapiro ........................ 714/38 |
| 5,948,112 A | * | 9/1999 | Shimada et al. ............. 714/16 |
| 5,987,252 A | * | 11/1999 | Leino et al. ................ 717/126 |

FOREIGN PATENT DOCUMENTS

| | | |
|---|---|---|
| JP | 5-53865 | 3/1993 |
| JP | 9-146797 | 1/1997 |
| JP | 10-312321 | 11/1998 |

* cited by examiner

*Primary Examiner*—Dieu-Minh Le
(74) *Attorney, Agent, or Firm*—Brenda O. Holmes; Kilpatrick Stockton LLP

(57) ABSTRACT

The present invention has an display section for displaying an operation state of a program to a user in a time series manner based on program execution history information, an input section for allowing the user to designate a portion of a defect in the displayed operation sate, and an operation analysis section for analyzing a cause of the defect from the portion of the defect pointed out from the user by the input section and from the operation state of the program, and for specifying a solution for solving the cause of the defect. The operation analysis section regenerates the operation state on which the specified solution is reflected, and the display section displays the cause of the defect, the solution and the regenerated operation state to the user.

13 Claims, 40 Drawing Sheets

FIG.3A
PRIOR ART

| type | oid | sysid | obj |
|------|-----|-------|-----|

FIG.3B
PRIOR ART

| | | | | |
|---|---|---|---|---|
| 6 | 0 | 1  |   | ···(i) |
| 1 | 1 | -9 | 2 | ···(ii) |
| 1 | 1 | -9 | 3 | ···(iii) |
| 1 | 1 | -17 |   | ···(iv) |
| 6 | 1 | 3  |   | ···(v) |
| 1 | 3 | -19 | 1 | ···(vi) |
| 6 | 3 | 1  |   | ···(vii) |

WHERE
sysid : sta_txt ... -9
      : ext_txt ... -10
      : slp_txt ... -17
      : wup_txt ... -19

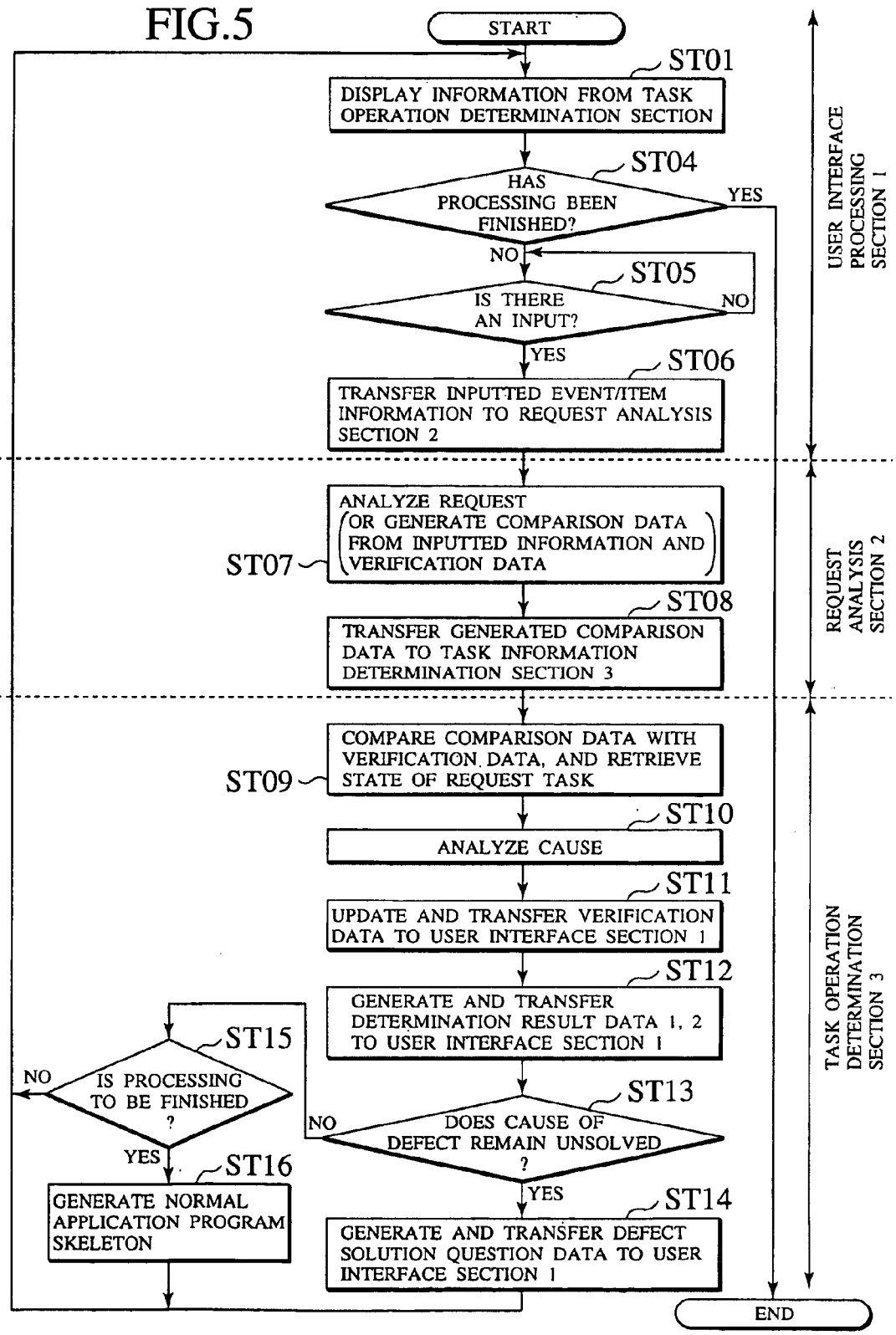

FIG.6

| ORDER OF EVENTS | EVENT ATTRIBUTE (ISSUANCE OF SYSTEM CALL) | ISSUED SYSTEM CALL | ISSUANCE ORIGINATION TASK ID | ISSUANCE ORIGINATION TASK PRIORITY |
|---|---|---|---|---|
| ORDER OF EVENTS | EVENT ATTRIBUTE (DISPATCH) | DISPATCH ORIGINATION TASK ID | DISPATCH ORIGINATION TASK PRIORITY | DISPATCH DESTINATION TASK ID |
| ORDER OF EVENTS | EVENT ATTRIBUTE (INTERRUPTION PROCESSING) | HANDLER ATTRIBUTE (CYCLE START HANDLER, ALARM HANDLER, INTERRUPTION HANDLER) | HANDLER NO. | — |
| ⋮ | ⋮ | ⋮ | ⋮ | ⋮ |

| TASK STATE AFTER ISSUING ISSUANCE ORIGINATION TASK | ISSUANCE DESTINATION TASK ID (ISSUANCE DESTINATION RESOURCE) | ISSUANCE DESTINATION TASK PRIORITY (ISSUANCE DESTINATION ID) | TASK STATE AFTER ISSUING ISSUANCE DESTINATION TASK |
|---|---|---|---|
| DISPATCH DESTINATION PRIORITY | — | — | — |
| — | — | — | — |
| ⋮ | ⋮ | ⋮ | ⋮ |

EVENT ATTRIBUTE : ISSUANCE OF SYSTEM CALL
　　　　　　　　　 DISPATCH INTERRUPTION PROCESSING
HANDLER ATTRIBUTE : CYCLE START HANDLER
　　　　　　　　　 ALARM HANDLER
　　　　　　　　　 INTERRUPTION HANDLER

FIG.7

| N | PRIOR EVENT | POSTERIOR EVENT | ITEM (TASK(y)) |
|---|---|---|---|
| | ⋮ | ⋮ | ⋮ |

TIMING (X) {covers PRIOR EVENT and POSTERIOR EVENT}

FIG.8

| (1)N | (2)REQUEST TASK | (3)STATE OF REQUEST TASK |
|---|---|---|
| ⋮ | ⋮ | ⋮ |
| ⋮ | ⋮ | ⋮ |

FIG.9

| (1)N | (2)TASK IN RUN STATE AT THE END OF EVENTS | (3)ext_tsk |
|---|---|---|
| ⋮ | ⋮ | ⋮ |
| ⋮ | ⋮ | ⋮ |

FIG.10

| (1)N | (2)ISSUANCE TARGET TO WHICH SYSTEM CALL FOR TURNING REQUEST TASK IN READY STATE IS ISSUED | (3)SYSTEM CALL FOR TURNING REQUEST TASK IN READY STATE |
|---|---|---|
| ⋮ | ⋮ | ⋮ |
| ⋮ | ⋮ | ⋮ |

FIG.18

⟨SYSTEM CALL CORRESPONDENCE TABLE⟩

| NO | SYSTEM CALL | CORRESPONDING SYSTEM CALL |
|---|---|---|
| 1 | sta_tsk | ext_tsk |
| 2 | slp_tsk | wup_tsk |
| 3 | wai_sem | sig_sem |
| ⋮ | ⋮ | ⋮ |

FIG. 20

●[PROCESSING 2]→[PROCESSING COMPLETED]
(VARIFICATION DATA)

| ORDER OF EVENTS | EVENT ATTRIBUTE | ISSUED SYSTEM CALL | HANDLER ATTRIBUTE | HANDLER NO. | ISSUANCE ORIGINATION TASK ID | ISSUANCE ORIGINATION TASK PRIORITY | TASK STATE AFTER ISSUING ISSUANCE ORIGINATION TASK | ISSUANCE DESTINATION TASK ID (ISSUANCE DESTINATION RESOURCE) | ISSUANCE DESTINATION TASK PRIORITY (ISSUANCE DESTINATION ID) | TASK STATE AFTER ISSUING ISSUANCE DESTINATION TASK |
|---|---|---|---|---|---|---|---|---|---|---|
| 1 | SYSTEM CALL | sta_tsk | — | — | START UP | — | RUNNING | TASK A | 3 | READY |
| 2 | SYSTEM CALL | sta_tsk | — | — | START UP | — | RUNNING | TASK B | 2 | READY |
| 3 | SYSTEM CALL | slp_tsk | — | — | START UP | — | WAITING | — | — | — |
| 4 | TASK DISPATCH | — | — | — | START UP | — | — | TASK B | 2 | RUNNING ★ |
| 5 | SYSTEM CALL | wup_tsk | — | — | TASK B | 2 | RUNNING | START UP | 1 | READY ★ |
| 6 | TASK DISPATCH | — | — | — | TASK B | 2 | DORMANT | START UP | 1 | RUNNING ★ |
| 7 | SYSTEM CALL | ext_tsk | — | — | START UP | 1 | — | — | — | — |
| 8 | TASK DISPATCH | — | — | — | START UP | 1 | — | TASK B | 2 | RUNNING ★ |
| 9 | SYSTEM CALL | ext_tsk | — | — | TASK B | 2 | DORMANT | — | — | — |
| 10 | TASK DISPATCH | — | — | — | TASK B | 2 | — | TASK A | 3 | RUNNING |

⟨COMPARISON DATA⟩

| N | PRIOR EVENT | POSTERIOR EVENT | ITEM (TASK(y)) |
|---|---|---|---|
| 1 | 7 | 7 | TASK A |

⟨DEFECT SOLUTION QUESTION DATA⟩

| (1)N | (2)ISSUANCE TARGET TO WHICH SYSTEM CALL FOR TURNING REQUEST TASK IN READY STATE IS ISSUED | (3)SYSTEM CALL FOR TURNING REQUEST TASK IN READY STATE |
|---|---|---|
| | | |

⟨DETERMINATION RESULT DATA 1⟩

| (1)N | (2)REQUEST TASK | (3)STATE OF REQUEST TASK |
|---|---|---|
| 1 | TASK A | READY ★ |
| 1 | TASK A | READY ★ |

⟨DETERMINATION RESULT DATA 2⟩

| (1)N | (2)TASK IN RUN STATE AT THE END OF EVENTS | (3)ext_tsk |
|---|---|---|
| 1 | START UP | ext_tsk ★ |
| 1 | TASK B | ext_tsk ★ |

FIG.21

```
/*********************************************
    File       : sample.c
    Data       : 1999/11/11
    Developer  : TOSHIBA
    Application Skeleton
*********************************************/
#include"itron.h"

#define  TASK_ID1     1
#define  TASK_ID2     2
#define  TASK_ID3     3

TASK startup() :
TASK TaskA() :
TASK TaskB() :

TASK startup() :
{
        ER ercd ;

ercd = sta_tsk(TASK_ID2,0) ;
        ercd = sta_tsk(TASK_ID3,0) ;
        ercd = slp_tsk() ;

ext_tsk() ; ------------------------------------ (a)
}
TASK TaskA()
{ for( ; : ){
        }

}

TASK TaskB()
{
        ER ercd ;

ercd = wup_tsk(TASK_ID1) ;

ext_tsk() ; ------------------------------------ (b)
}
```

FIG.24

●[PROCESSING 1]→[FIRST REQUEST]
⟨VARIFICATION DATA⟩

| ORDER OF EVENTS | EVENT ATTRIBUTE | ISSUED SYSTEM CALL | HANDLER ATTRIBUTE | HANDLER NO. | ISSUANCE ORIGINATION TASK ID | ISSUANCE ORIGINATION TASK PRIORITY | TASK STATE AFTER ISSUING ISSUANCE ORIGINATION TASK | ISSUANCE DESTINATION TASK ID (ISSUANCE DESTINATION RESOURCE) | ISSUANCE DESTINATION TASK PRIORITY (ISSUANCE DESTINATION ID) | TASK STATE AFTER ISSUING ISSUANCE DESTINATION TASK |
|---|---|---|---|---|---|---|---|---|---|---|
| 1 | SYSTEM CALL | sta_tsk | — | — | START UP | — | RUNNING | TASK A | 2 | READY |
| 2 | SYSTEM CALL | sta_tsk | — | — | START UP | — | RUNNING | TASK B | 2 | READY |
| 3 | SYSTEM CALL | sta_tsk | — | — | START UP | — | RUNNING | TASK C | 2 | READY |
| 4 | SYSTEM CALL | ext_tsk | — | — | START UP | — | DORMANT | — | — | — |
| 5 | TASK DISPATCH | — | — | — | START UP | — | — | TASK A | 2 | RUNNING |
| 6 | SYSTEM CALL | wai_sem | — | — | TASK A | 2 | WAITING | SEMAPHORE | 1 | — |
| 7 | TASK DISPATCH | — | — | — | TASK A | 2 | — | TASK B | 2 | RUNNING |
| 8 | SYSTEM CALL | slp_tsk | — | — | TASK B | 2 | WAITING | — | — | — |
| 9 | TASK DISPATCH | — | — | — | TASK B | 2 | — | TASK C | 2 | RUNNING |
| 10 | SYSTEM CALL | ext_tsk | — | — | TASK C | 2 | DORMANT | — | — | — |
| 11 | TASK DISPATCH | — | — | — | TASK C | 2 | — | IDLE MODE | — | — |

⟨COMPARISON DATA⟩

| N | PRIOR EVENT | POSTERIOR EVENT | ITEM (TASK(y)) ★ |
|---|---|---|---|
| 1 | 12 | 12 | TASK B |

⟨DEFECT SOLUTION QUESTION DATA⟩

| (1)N | (2)ISSUANCE TARGET TO WHICH SYSTEM CALL FOR TURNING REQUEST TASK IN READY STATE IS ISSUED | (3)SYSTEM CALL FOR TURNING REQUEST TASK IN READY STATE |
|---|---|---|
| | | |
| | | |

⟨DETERMINATION RESULT DATA 1⟩

| (1)N | (2)REQUEST TASK | (3)STATE OF REQUEST TASK |
|---|---|---|
| | | |

⟨DETERMINATION RESULT DATA 2⟩

| (1)N | (2)TASK IN RUN STATE AT THE END OF EVENTS | (3)ext_tsk |
|---|---|---|
| | | |
| | | |

FIG.25

● [PROCESSING 1]→[SECOND REQUEST]
⟨VARIFICATION DATA⟩

| ORDER OF EVENTS | EVENT ATTRIBUTE | ISSUED SYSTEM CALL | HANDLER ATTRIBUTE | HANDLER NO. | ISSUANCE ORIGINATION TASK ID | ISSUANCE ORIGINATION TASK PRIORITY | TASK STATE AFTER ISSUING ISSUANCE ORIGINATION TASK | ISSUANCE DESTINATION TASK ID (ISSUANCE DESTINATION RESOURCE) | ISSUANCE DESTINATION TASK PRIORITY (ISSUANCE DESTINATION ID) | TASK STATE AFTER ISSUING ISSUANCE DESTINATION TASK |
|---|---|---|---|---|---|---|---|---|---|---|
| 1 | SYSTEM CALL | sta_tsk | — | — | START UP | — | RUNNING | TASK A | 2 | READY |
| 2 | SYSTEM CALL | sta_tsk | — | — | START UP | — | RUNNING | TASK B | 2 | READY |
| 3 | SYSTEM CALL | sta_tsk | — | — | START UP | — | RUNNING | TASK C | 2 | READY |
| 4 | SYSTEM CALL | ext_tsk | — | — | START UP | — | DORMANT | — | — | — |
| 5 | TASK DISPATCH | — | — | — | START UP | — | — | TASK A | 2 | RUNNING |
| 6 | SYSTEM CALL | wai_sem | — | — | TASK A | 2 | WAITING | SEMAPHORE | 1 | — |
| 7 | TASK DISPATCH | — | — | — | TASK A | 2 | — | TASK B | 2 | RUNNING |
| 8 | SYSTEM CALL | slp_tsk | — | — | TASK B | 2 | WAITING | — | — | — |
| 9 | TASK DISPATCH | — | — | — | TASK B | 2 | — | TASK C | 2 | RUNNING |
| 10 | SYSTEM CALL | ext_tsk | — | — | TASK C | 2 | DORMANT | — | — | — |
| 11 | TASK DISPATCH | — | — | — | TASK C | 2 | — | IDLE MODE | — | — |

⟨COMPARISON DATA⟩

| N | PRIOR EVENT | POSTERIOR EVENT | ITEM (TASK(y)) |
|---|---|---|---|
| 1 | 12 | 12 | TASK B |
| 2 | 6 | 7 | TASK A |

⟨DEFECT SOLUTION QUESTION DATA⟩

| (1)N | (2)ISSUANCE TARGET TO WHICH SYSTEM CALL FOR TURNING REQUEST TASK IN READY STATE IS ISSUED | (3)SYSTEM CALL FOR TURNING REQUEST TASK IN READY STATE |
|---|---|---|
| 1 | TASK A | wup_tsk ★ |

⟨DETERMINATION RESULT DATA 1⟩

| (1)N | (2)REQUEST TASK | (3)STATE OF REQUEST TASK |
|---|---|---|
| 1 | TASK B | WAITING ★ |

⟨DETERMINATION RESULT DATA 2⟩

| (1)N | (2)TASK IN RUN STATE AT THE END OF EVENTS | (3)ext_tsk |
|---|---|---|
| | | ★ |

FIG.26

●[PROCESSING 3]→[THIRD REQUEST]
⟨VARIFICATION DATA⟩

| ORDER OF EVENTS | EVENT ATTRIBUTE | ISSUED SYSTEM CALL | HANDLER ATTRIBUTE | HANDLER NO. | ISSUANCE ORIGINATION TASK ID | ISSUANCE ORIGINATION TASK PRIORITY | TASK STATE AFTER ISSUING ISSUANCE ORIGINATION TASK | ISSUANCE DESTINATION TASK ID (ISSUANCE DESTINATION RESOURCE) | ISSUANCE DESTINATION TASK PRIORITY (ISSUANCE DESTINATION ID) | TASK STATE AFTER ISSUING ISSUANCE DESTINATION TASK |
|---|---|---|---|---|---|---|---|---|---|---|
| 1 | SYSTEM CALL | sta_tsk | — | — | START UP | — | RUNNING | TASK A | 2 | READY |
| 2 | SYSTEM CALL | sta_tsk | — | — | START UP | — | RUNNING | TASK B | 2 | READY |
| 3 | SYSTEM CALL | sta_tsk | — | — | START UP | — | RUNNING | TASK C | 2 | READY |
| 4 | SYSTEM CALL | ext_tsk | — | — | START UP | — | DORMANT | — | — | RUNNING |
| 5 | TASK DISPATCH | — | — | — | TASK A | 2 | — | TASK A | 2 | RUNNING |
| 6 | SYSTEM CALL | wai_sem | — | — | TASK A | 2 | WAITING | SEMAPHORE | — | — |
| 7 | TASK DISPATCH | — | — | — | TASK B | 2 | — | TASK B | 1 | RUNNING |
| 8 | SYSTEM CALL | slp_tsk | — | — | TASK B | 2 | WAITING | — | 2 | RUNNING |
| 9 | TASK DISPATCH | — | — | — | TASK C | 2 | — | TASK C | — | — |
| 10 | SYSTEM CALL | ext_tsk | — | — | TASK C | 2 | DORMANT | — | — | — |
| 11 | TASK DISPATCH | — | — | — | TASK C | 2 | — | IDLE MODE | — | — |

⟨COMPARISON DATA⟩

| N | PRIOR EVENT | POSTERIOR EVENT | ITEM (TASK(y)) |
|---|---|---|---|
| 1 | 12 | 12 | TASK B |
| 2 | 6 | 7 | TASK A |
| 3 | 9 | 10 | TASK C |

⟨DETERMINATION RESULT DATA 1⟩ *

| (1)N | (2)REQUEST TASK | (3)STATE OF REQUEST TASK |
|---|---|---|
| 1 | TASK B | WAITING |
| 2 | TASK A | WAITING |

⟨DEFECT SOLUTION QUESTION DATA⟩

| (1)N | (2)ISSUANCE TARGET TO WHICH SYSTEM CALL FOR TURNING REQUEST TASK IN READY STATE IS ISSUED | (3)SYSTEM CALL FOR TURNING REQUEST TASK IN READY STATE |
|---|---|---|
| 1 | TASK A | wup_tsk |
| 2 | TASK C | sig_sem |

⟨DETERMINATION RESULT DATA 2⟩

| (1)N | (2)TASK IN RUN STATE AT THE END OF EVENTS | (3)ext_tsk |
|---|---|---|
|  |  |  |
|  |  |  |

FIG.27

●[PROCESSING 3]→[THIRD REQUEST]
〈VARIFICATION DATA〉

| ORDER OF EVENTS | EVENT ATTRIBUTE | ISSUED SYSTEM CALL | HANDLER ATTRIBUTE | HANDLER NO. | ISSUANCE ORIGINATION TASK ID | ISSUANCE ORIGINATION TASK PRIORITY | TASK STATE AFTER ISSUING ISSUANCE ORIGINATION TASK | ISSUANCE DESTINATION TASK ID (ISSUANCE DESTINATION RESOURCE) | ISSUANCE DESTINATION TASK PRIORITY (ISSUANCE DESTINATION ID) | TASK STATE AFTER ISSUING ISSUANCE DESTINATION TASK |
|---|---|---|---|---|---|---|---|---|---|---|
| 1 | SYSTEM CALL | sta_tsk | — | — | START UP | — | RUNNING | TASK A | 2 | READY |
| 2 | SYSTEM CALL | sta_tsk | — | — | START UP | — | RUNNING | TASK B | 2 | READY |
| 3 | SYSTEM CALL | sta_tsk | — | — | START UP | — | RUNNING | TASK C | 2 | READY |
| 4 | SYSTEM CALL | ext_tsk | — | — | START UP | — | DORMANT | — | — | — |
| 5 | TASK DISPATCH | — | — | — | TASK A | — | — | TASK A | 2 | RUNNING |
| 6 | SYSTEM CALL | wai_sem | — | — | TASK A | 2 | WAITING | SEMAPHORE | — | — |
| 7 | TASK DISPATCH | — | — | — | TASK B | — | — | TASK B | 2 | RUNNING |
| 8 | SYSTEM CALL | slp_tsk | — | — | TASK B | 2 | WAITING | — | — | — |
| 9 | TASK DISPATCH | — | — | — | TASK C | — | — | TASK C | 2 | RUNNING |
| 10 | SYSTEM CALL | sig_sem | — | — | TASK C | 2 | RUNNING | SEMAPHORE | — | — |
| 11 | SYSTEM CALL | ext_tsk | — | — | TASK C | 2 | DORMANT | — | — | — |
| 12 | TASK DISPATCH | — | — | — | TASK C | — | — | TASK A | 2 | RUNNING |

〈COMPARISON DATA〉

| N | PRIOR EVENT | POSTERIOR EVENT | ITEM (TASK(y)) |
|---|---|---|---|
| 1 | 12 | 12 | TASK B |
| 2 | 6 | 7 | TASK A |
| 3 | 9 | 10 | TASK C |

〈DETERMINATION RESULT DATA 1〉

| (1)N | (2)REQUEST TASK | (3)STATE OF REQUEST TASK |
|---|---|---|
| 1 | TASK B | WAITING |
| 2 | TASK A | RUNNING |

〈DEFECT SOLUTION QUESTION DATA〉

| (1)N | (2)ISSUANCE TARGET TO WHICH SYSTEM CALL FOR TURNING REQUEST TASK IN READY STATE IS ISSUED | (3)SYSTEM CALL FOR TURNING REQUEST TASK IN READY STATE |
|---|---|---|
| 1 | TASK A | wup_tsk |
| 2 | TASK C | sig_sem |

〈DETERMINATION RESULT DATA 2〉

| (1)N | (2)TASK IN RUN STATE AT THE END OF EVENTS | (3)ext_tsk |
|---|---|---|
| | | |
| | | |

FIG.28

● [PROCESSING 5]→[FIFTH REQUEST]
⟨VARIFICATION DATA⟩

| ORDER OF EVENTS | EVENT ATTRIBUTE | ISSUED SYSTEM CALL | HANDLER ATTRIBUTE | HANDLER NO. | ISSUANCE ORIGINATION TASK ID | ISSUANCE ORIGINATION TASK PRIORITY | TASK STATE AFTER ISSUING ISSUANCE ORIGINATION TASK | ISSUANCE DESTINATION TASK ID (ISSUANCE DESTINATION RESOURCE) | ISSUANCE DESTINATION TASK PRIORITY (ISSUANCE DESTINATION ID) | TASK STATE AFTER ISSUING ISSUANCE DESTINATION TASK |
|---|---|---|---|---|---|---|---|---|---|---|
| 1 | SYSTEM CALL | sta_tsk | — | — | START UP | — | RUNNING | TASK A | 2 | READY |
| 2 | SYSTEM CALL | sta_tsk | — | — | START UP | — | RUNNING | TASK B | 2 | READY |
| 3 | SYSTEM CALL | sta_tsk | — | — | START UP | — | RUNNING | TASK C | 2 | READY |
| 4 | SYSTEM CALL | ext_tsk | — | — | START UP | — | DORMANT | — | — | — |
| 5 | TASK DISPATCH | — | — | — | TASK A | 1 | RUNNING | TASK A | 2 | RUNNING |
| 6 | SYSTEM CALL | wai_sem | — | — | TASK A | 1 | WAITING | SEMAPHORE | — | — |
| 7 | TASK DISPATCH | — | — | — | TASK A | 1 | — | TASK B | 2 | RUNNING |
| 8 | SYSTEM CALL | slp_tsk | — | — | TASK B | 2 | WAITING | — | — | — |
| 9 | TASK DISPATCH | — | — | — | TASK B | 2 | — | TASK C | 2 | RUNNING |
| 10 | SYSTEM CALL | sig_sem | — | — | TASK C | 2 | RUNNING | SEMAPHORE | — | — |
| 11 | SYSTEM CALL | ext_tsk | — | — | TASK C | 2 | DORMANT | — | — | — |
| 12 | TASK DISPATCH | — | — | — | TASK C | 2 | — | TASK A | 2 | RUNNING |
| 13 | SYSTEM CALL | wup_tsk | — | — | TASK A | 2 | RUNNING | TASK B | 2 | READY |
| 14 | SYSTEM CALL | ext_tsk | — | — | TASK A | 2 | DORMANT | — | — | — |
| 15 | TASK DISPATCH | — | — | — | TASK A | 2 | — | TASK B | 2 | RUNNING | ★

⟨COMPARISON DATA⟩

| N | PRIOR EVENT | POSTERIOR EVENT | ITEM (TASK(y)) |
|---|---|---|---|
| 1 | 12 | 12 | TASK B |
| 2 | 6 | 7 | TASK C |
| 3 | 9 | 10 | TASK B |
| 1 | 13 | 13 | TASK B |
| 2 | 11 | 12 | TASK A | ★

⟨DETERMINATION RESULT DATA 1⟩

| (1)N | (2)REQUEST TASK | (3)STATE OF REQUEST TASK |
|---|---|---|
| 1 | TASK B | RUNNING |
| 2 | TASK A | RUNNING |

⟨DEFECT SOLUTION QUESTION DATA⟩

| (1)N | (2)ISSUANCE TARGET TO WHICH SYSTEM CALL FOR TURNING REQUEST TASK IN READY STATE IS ISSUED | (3)SYSTEM CALL FOR TURNING REQUEST TASK IN READY STATE |
|---|---|---|
| 1 | TASK A | wup_tsk |
| 2 | TASK C | sig_sem |

⟨DETERMINATION RESULT DATA 2⟩

| (1)N | (2)TASK IN RUN STATE AT THE END OF EVENTS | (3)ext_tsk |
|---|---|---|
| 1 | TASK A | ext_tsk | ★

● [PROCESSING 6]→[PROCESSING COMPLETED]
⟨VARIFICATION DATA⟩

| ORDER OF EVENTS | EVENT ATTRIBUTE | ISSUED SYSTEM CALL | HANDLER ATTRIBUTE | HANDLER NO. | ISSUANCE ORIGINATION TASK ID | ISSUANCE ORIGINATION TASK PRIORITY | TASK STATE AFTER ISSUING ISSUANCE ORIGINATION TASK | ISSUANCE DESTINATION TASK ID (ISSUANCE DESTINATION RESOURCE) | ISSUANCE DESTINATION TASK PRIORITY (ISSUANCE DESTINATION ID) | TASK STATE AFTER ISSUING ISSUANCE DESTINATION TASK |
|---|---|---|---|---|---|---|---|---|---|---|
| 1 | SYSTEM CALL | sta_tsk | — | — | START UP | 1 | RUNNING | TASK A | 2 | READY |
| 2 | SYSTEM CALL | sta_tsk | — | — | START UP | 1 | RUNNING | TASK B | 2 | READY |
| 3 | SYSTEM CALL | sta_tsk | — | — | START UP | 1 | RUNNING | TASK C | 2 | READY |
| 4 | SYSTEM CALL | ext_tsk | — | — | START UP | 1 | DORMANT | — | — | RUNNING |
| 5 | TASK DISPATCH | — | — | — | TASK A | 2 | — | TASK A | 2 | RUNNING |
| 6 | SYSTEM CALL | wai_sem | — | — | TASK A | 2 | WAITING | SEMAPHORE | — | — |
| 7 | TASK DISPATCH | — | — | — | TASK A | 2 | — | TASK B | 2 | RUNNING |
| 8 | SYSTEM CALL | slp_tsk | — | — | TASK B | 2 | WAITING | — | — | — |
| 9 | TASK DISPATCH | — | — | — | TASK B | 2 | — | TASK C | 2 | RUNNING |
| 10 | SYSTEM CALL | sig_sem | — | — | TASK C | 2 | RUNNING | SEMAPHORE | — | — |
| 11 | SYSTEM CALL | ext_tsk | — | — | TASK C | 2 | DORMANT | — | — | RUNNING |
| 12 | TASK DISPATCH | — | — | — | TASK A | 2 | — | TASK A | 2 | RUNNING |
| 13 | SYSTEM CALL | wup_tsk | — | — | TASK A | 2 | RUNNING | TASK B | 2 | READY |
| 14 | SYSTEM CALL | ext_tsk | — | — | TASK A | 2 | DORMANT | — | — | RUNNING ★★ |
| 15 | TASK DISPATCH | — | — | — | TASK A | 2 | — | TASK B | 2 | RUNNING |

⟨COMPARISON DATA⟩

| N | PRIOR EVENT | POSTERIOR EVENT | ITEM (TASK(y)) |
|---|---|---|---|
| 1 | 12 | 12 | TASK B |
| 2 | 6 | 7 | TASK A |
| 3 | 9 | 10 | TASK C |
| 1 | 13 | 13 | TASK B |
| 2 | 6 | 7 | TASK A |

⟨DEFECT SOLUTION QUESTION DATA⟩

| (1) N | (2) ISSUANCE TARGET TO WHICH SYSTEM CALL FOR TURNING REQUEST TASK IN READY STATE IS ISSUED | (3) SYSTEM CALL FOR TURNING REQUEST TASK IN READY STATE |
|---|---|---|
| 1 | TASK A | wup_tsk |
| 2 | TASK C | sig_sem |

⟨DETERMINATION RESULT DATA 1⟩ ★

| (1) N | (2) REQUEST TASK | (3) STATE OF REQUEST TASK |
|---|---|---|
| 1 | TASK B | READY |
| 2 | TASK A | RUNNING |

⟨DETERMINATION RESULT DATA 2⟩

| (1) N | (2) TASK IN RUN STATE AT THE END OF EVENTS | (3) ext_tsk |
|---|---|---|
| 1 | TASK A | ext_tsk |

FIG.29

→ IS FLOW OF PROCESS AND
NUMERIC CHARACTER FROM
(1) TO (5) IS STEP OF PROCESS

INFORMATION PROCESSING APPARATUS, DEFECT ANALYSIS PROGRAM, AND DEFECT ANALYSIS METHOD

CROSS REFERENCE TO RELATED APPLICATIONS

This patent application claims for benefit of the filing date of Japanese Patent Application No. P11-375859 filed on Dec. 28, 1999, and P2000-396112 filed on Dec. 26, 2000; the entire contents of which are hereby incorporated by reference.

BACKGROUND OF THE INVENTION

1. Field of the Invention

The present invention relates to an information processing apparatus, a defect analysis program, a defect analysis method and application program development assistance system used for testing and debugging multitask programs operating on a real-time OS (Real-time Operating System).

2. Description of the Related Art

The application range of real-time OS represented by a TRON (The Real-time Operating System Nucleus) goes on increase following the development of microprocessor technique. The real-time OS is applied not only to the industrial field but also to the business equipment field such as communications equipment and office equipment as well as ordinary life equipment such as home appliances and portable telephones.

Normally, it is not easy to trace the movements of programs so as to analyze the discrepancies of a multitask type application program running on such a real-time OS. Since the real-time OS adopts a multitask scheme for executing a plurality of programs by changing over tasks operating at specific timing one after another, the defect of the program cannot be analyzed only by tracing one program.

Under these circumstances, an OS which functions to trace program operations has been developed. According to this OS, program execution history information is employed as one of the keys to analyze program operation states. As shown in FIG. 1, program execution history information 4 is outputted onto a memory of an OS 101 by an OS 101 having a program operation tracing function and further outputted on a memory held by a debugger 102 or the like by a development tool thereof.

FIG. 3 shows an example of program execution history information on a program compliant with μITRON (Micro Industrial TRON). FIG. 3(a) is an example of the format of a system call issuance history, where one record represents one event. This format consists of function type (type), issuance origination task (oid), system call type (sysid) and issuance destination task (obj). Types of execution history information to be outputted involve task change-over history information, handler execution history information and the like in addition to the above-stated system call issuance history information.

FIG. 3(b) shows one example of execution history data outputted onto the memory by the OS 101, the debugger 102 or the like. In FIG. 3(b), symbol (i) indicates that a task is changed over to another task and that control is moved from an idle state (task=0) to a task 1 (task=1). Symbol (ii) indicates that a system call is issued and that a system call of such a type as sta_tsk (sysid=−19) is issued from the task 1 (oid=1) to a task 2 (obj=2).

As stated above, although program execution history has been able to be stored as data and the history is used as a key to analyze the defect of the program, the following problems arise.

First, because of the memory capacity of a controller, there is a limit to the quantity of history information which can be acquired. Actually, as shown in FIG. 2, history information is stored in pieces. In case of a system intended to be provided at low cost, particularly, the memory capacity of the system is greatly limited.

Second, as shown in FIG. 3, history information to be outputted is a series of characters mainly consisting of numbers and tends to be outputted in large quantity. Due to this, it is quite difficult to analyze a program defect by following a program operation trace using the history information.

As a result, it still takes lot of time to analyze the program defect, which has had great effect on development cost and development time.

Third, conventionally, the programming steps performed for an execution environment includes: grasping a state change of a resource under the control of the execution environment; and a judging the coincidence of the programming contents. Even if one can perform programming in consideration of an interrupt function or the like that execution environment hardware has, there is no way to check the coincidence. Thus, there has been a method for actually executing an execution object created from its program under the same conditions as execution environment, thereby checking a behavior of an application system.

However, in the above-described conventional method, even if a simple programming error occurs, such error cannot be judged as long as the execution object is actually executed.

SUMMARY OF THE INVENTION

The present invention has been made to solve the above-stated disadvantages. It is, therefore, an object of the present invention to provide an information processing apparatus capable of specifying a cause of a defect and its solution from a defective portion pointed out by a user in an interactive manner and from program execution history information and capable of presenting the cause of the defect and its solution to a user, and a recording medium mounted on an information processing apparatus and storing a defect analysis program.

It is the second object of the present invention to provide an information processing apparatus capable of generating a program which solves the specified defect from the cause of the defect and its solution and capable of presenting the program to the user, and a recording medium storing a defect analysis program mounted on an information processing apparatus.

It is the third object of the present invention to provide an application development system capable of enabling efficient application system development by: visually checking the behavior of an application system in accordance with operation rules of the execution environment at the stage of programming; finding a programming error earlier; and reducing a return of the work steps.

To obtain the above objects, the present invention is characterized by comprising: display means for displaying an operation state of a program by an X-Y coordinate with respect to an X-axis value representing timings of events and a Y-axis value representing tasks, to a user in a time-series manner based on program execution history information; input means for allowing the user to designate a portion of a defect; operation analysis means for analyzing a cause of the defect from a timing and a task of the defect designated from the user by the input means and from the program operation state, and for specifying a solution for solving the cause of the defect, and characterized in that the operation analysis means regenerates an operation state on which the solution is reflected; and the display means displays the cause of the defect, the solution and the regenerated operation state to the user. Here, the present invention is characterized in that if a portion in which the solution is reflected on the operation state cannot be specified, then the user is urged to designate the portion in which the solution is reflected on the operation state, and the operation analysis means regenerates the operation state on which the solution is reflected in this designated portion; and in that the display means displays the cause of the defect, the solution and the regenerated operation state to the user.

Further, the present invention is characterized by automatically generating a program skeleton satisfying an original specification based on the solution and the execution history information.

According to the present invention, it is possible to specify the cause of the defect and its solution from the defective portion pointed out by the user and the program execution history information in an interactive manner, and to present a program operation on which the solution is reflected to the user.

Moreover, it is possible to automatically generate a program which has solved the defect from the specified cause of the defect and the specified solution and to present the program to the user.

Further, the present invention is characterized as a development assistance system used for development of an application program executed on a hardware resource, the development assistance system comprising: an environment definition section of defining system environment when the application program is executed in the execution environment included of a hardware resource and software components, and defining operation rules of the execution environment; a check section of checking the virtual execution state (hereinafter, referred to as "virtual execution state") on the execution environment based on the environment definition; and a display information generating section of generating display information for virtually displaying the virtual execution state.

In addition, in the present invention, there is preferably provided a display device for displaying the display information; and an interface section being formed on a display screen of the display device, the interface section being adopted to operate an operation for changing the virtually displayed virtual operation state on the display screen.

According to the present invention, the execution state on an actual hardware resource can be reproduced in accordance with environment definition such as operation rules for execution environment, whereby the behavior of an application system can be checked. Therefore, earlier program error finding can be performed than that in a conventional method, and the return of the work steps is reduced, thus enabling efficient application development.

Other and further objects and features of this invention will be become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 3 is an image view showing one example of the constitution and data of the conventional execution history information;

FIG. 5 is a flow chart showing an processing example of a defect analysis program mounted on the information processing apparatus according to the present invention;

FIG. 6 is a schematic diagram showing one example of the format of verification data used by the information processing apparatus according to the present invention;

FIG. 7 is a schematic diagram showing an example of the format of comparison data used by the information processing apparatus according to the present invention;

FIG. 8 is a schematic diagram showing an example of the format of determination result data 1 used by the information processing apparatus according to the present invention;

FIG. 9 is a schematic diagram showing an example of the format of determination result data 2 used by the information processing apparatus according to the present invention;

FIG. 10 is a schematic diagram showing an example of the format of defect solution question data used by the information processing apparatus according to the present invention;

FIG. 18 is a schematic diagram showing an example of a system call correspondence table used by the information processing apparatus according to the present invention;

FIG. 20 shows the states of various data in the first embodiment;

FIG. 21 shows an example of the generation of a program skeleton in the first embodiment;

FIG. 24 shows the states of various data in the second embodiment;

FIG. 25 shows the states of various data in the second embodiment;

FIG. 26 shows the states of various data in the second embodiment;

FIG. 27 shows the states of various data in the second embodiment;

FIG. 28 shows the states of various data in the second embodiment;

FIG. 29 shows the states of various data in the second embodiment;

DETAILED DESCRIPTION OF THE PREFERRED EMBODIMENTS

The embodiments of the present invention will be described hereinafter with reference to the accompanying drawings.

Figure 1:
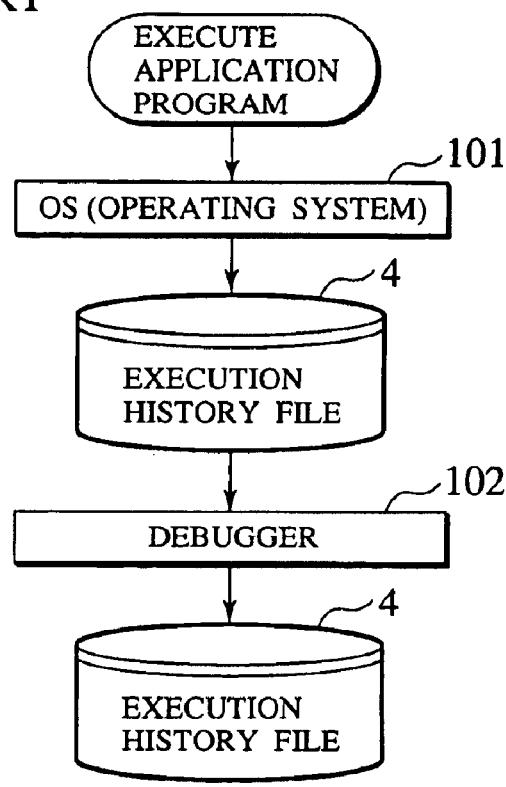
FIG. 1 is a schematic diagram showing the constitution of a conventional debugger.
Figure 2:
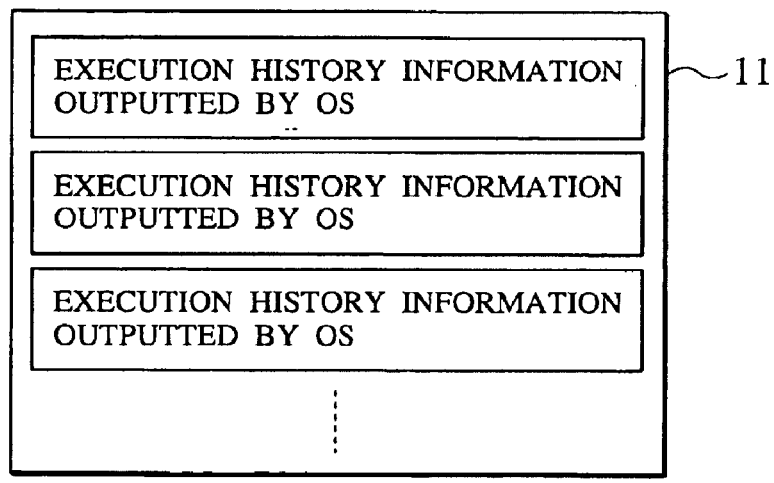
FIG. 2 is a schematic diagram showing the constitution of execution history information outputted by the conventional debugger.
Figure 4:
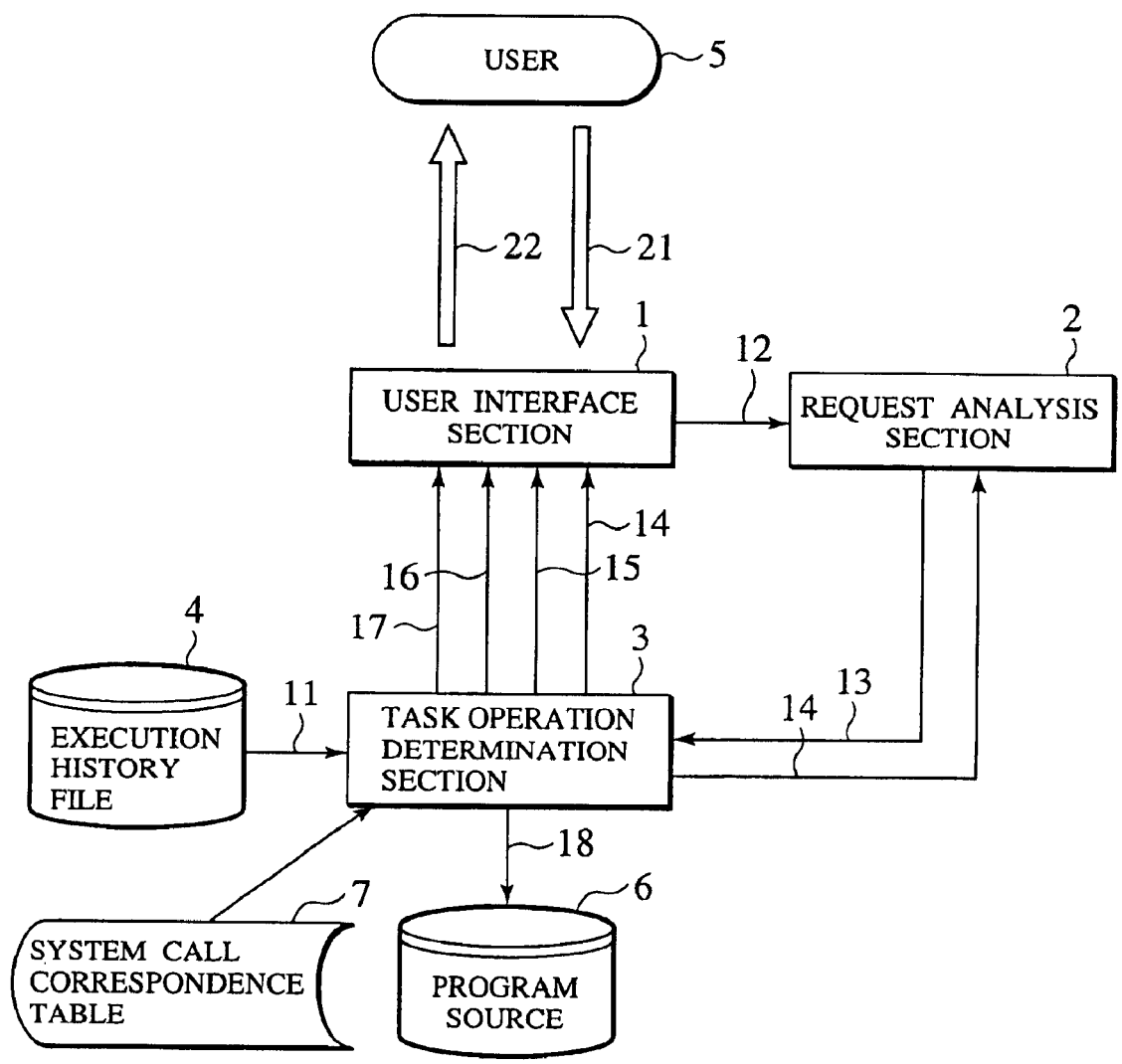
FIG. 4 is a schematic diagram showing one embodiment of an information processing apparatus according to the present invention.

FIG. 4 is a schematic block diagram showing one embodiment of an information processing apparatus according to the present invention. FIG. 5 is a flow chart showing a processing flow of a defect analysis program mounted on the information processing apparatus according to the present invention.

In FIG. 4, the information processing apparatus consists of a user interface section 1 receiving an input 11 from a user 5 and presents information 12 to the user 5, a request analysis section 2 analyzing input information from the user 5 and received by the user interface section 1, and transmitting the analyzed input information to a task operation determination section 3, and the task operation determination section 3 specifying a cause of the defect of a program and its solution based on program execution history information 11 stored in a execution history file 4 and information from a system call correspondence table 7 and from the task determination section 3, transmitting various analysis result information to the user interface section 1, generating a program for solving the defect from the analysis result information and outputting the program to a program file.

Next, an overall processing flow will be described with reference to FIG. 5.

The user interface section 1 presents verification data 14 (FIG. 6) generated in advance by the task operation determination section 3 based on the program execution history information 11 to the user 5 (in a step ST01). If the user 5 checks the verification data 14 thus presented and confirms that there is no operational defect, then the processing is finished (in a step ST04). On the other hand, if the user 5 discovers a defect in the displayed verification data 14, the user 5 points out a defective portion (in a step ST05). The user interface section 1 transfers the defective portion 12 inputted by the user 5 to the request analysis section 2 (in a step ST06).

Next, the request analysis section 2 generates comparison data 13 (FIG. 7) from the defective portion 12 pointed out and inputted by the user 5 and received from the user interface section 1 and the verification data 14 generated in advance by the task operation determination section 3 (in a step ST07), and transfers the generated comparison data 13 to the task operation determination section 3 (in a step ST08).

Then, the task operation determination section 3 compares the comparison data 13 received from the request analysis section 2 with the verification data 14 generated in advance, retrieves the state of a request task (in a step ST09) and analyzes the cause of the defect (in a step ST10). After specifying the cause of the defect, the task operation determination section 3 reflects a function of solving the defect on the verification data 14 and then transfers the resultant verification data 14 to the user interface section 1 (in a step ST11). Thereafter, the task operation determination section 3 generates and transfers determination result data 1 (FIG. 8) and determination result data 2 (FIG. 9) to the user interface section 1 (in a step ST12).

If the defect has been entirely solved (in a step ST13) and the processing is to be finished (in a step ST15), a normal program source 18 which has solved the defect based on the verification data 14 updated in the step ST11 is generated (in a step ST16) and control is returned to the user interface section 1. On the other hand, if the cause of the defect remains unsolved (in a step ST14), the task operation determination section 3 generates defect solution question data 17 (FIG. 10) to be inquired to the user so as to solve the defect, transfers the generated data 17 to the user interface section 1 (in a step ST14) and returns control to the user interface section 1.

The series of processing steps from ST01 to ST16 stated above are repeated until the defect of the program is solved to thereby finish the processing.

Next, based on an example of a program in which a defect actually exists, the processing operation of the information processing apparatus on which a defect analysis program according to the present invention is mounted will be described in more detail.

Here, description will be given while taking an application program running on a real-time OS compliant with μITRON3.0 as an example.

(First Embodiment)

In this embodiment, it is assumed that a program is a alarm function-added clock program. The following three tasks are used in this program:
(1) startup (task_ID=1, priority=1) [alarm setting mode];
(2) task A (task_ID=2, priority=3) [normal mode]; and
(3) task B (task_ID=3, priority=2).

Figure 11:
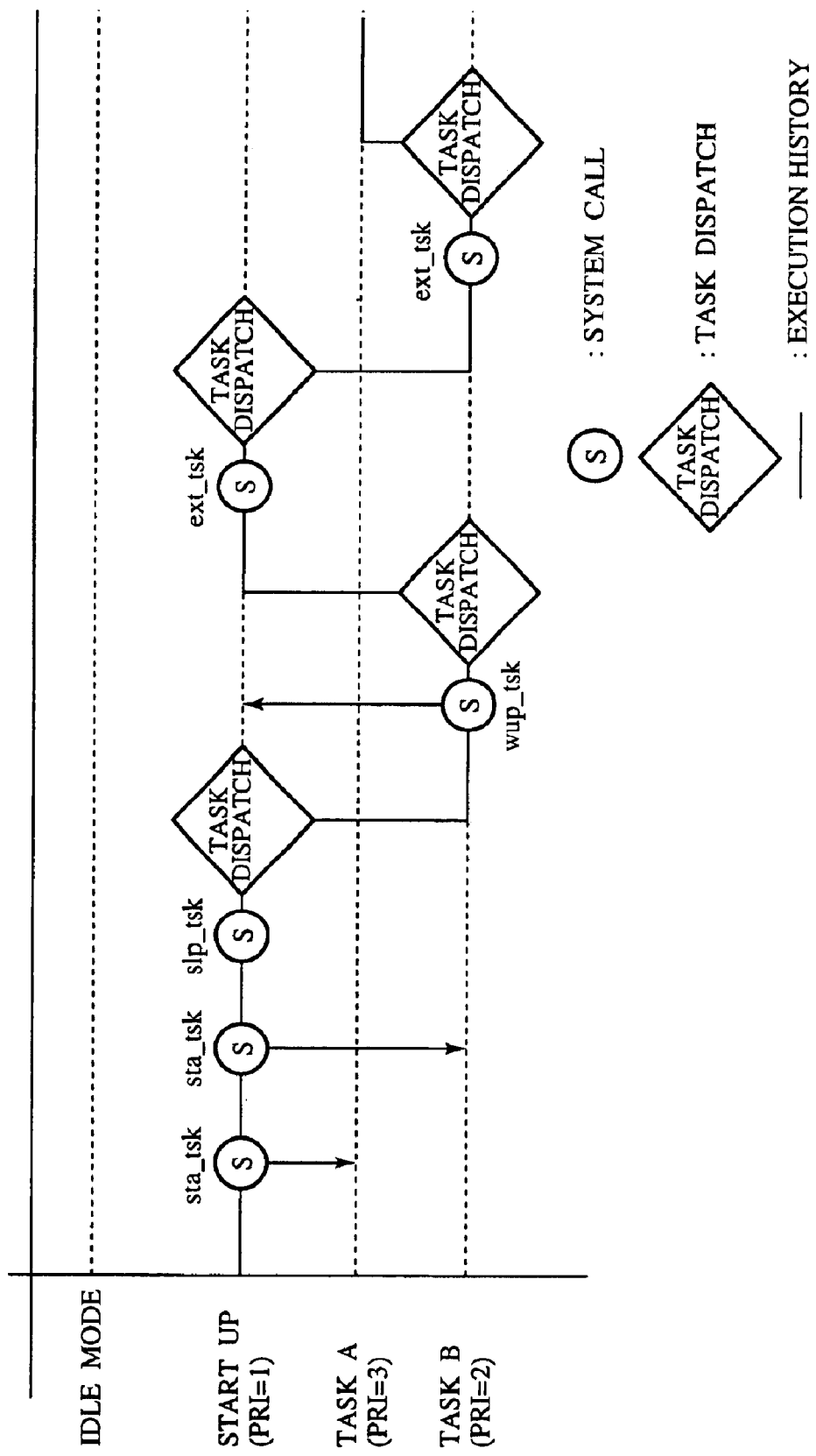
FIG. 11 is an input/output related view showing an operation status according to the specification of an application program assumed in the first embodiment.

If an alarm is set (the alarm setting mode is executed), the mode of this program is turned into the normal mode and then the processing is finished. Originally, this program is an application program which was generated while assuming such an operation as that shown in a time chart of FIG. 11. For example, if attention is paid to a point when the processing is finished, the processing is finished at the task A (normal mode), i.e., a finally executed task at that point is the task A, which is the original specification of this program.

Figure 12:
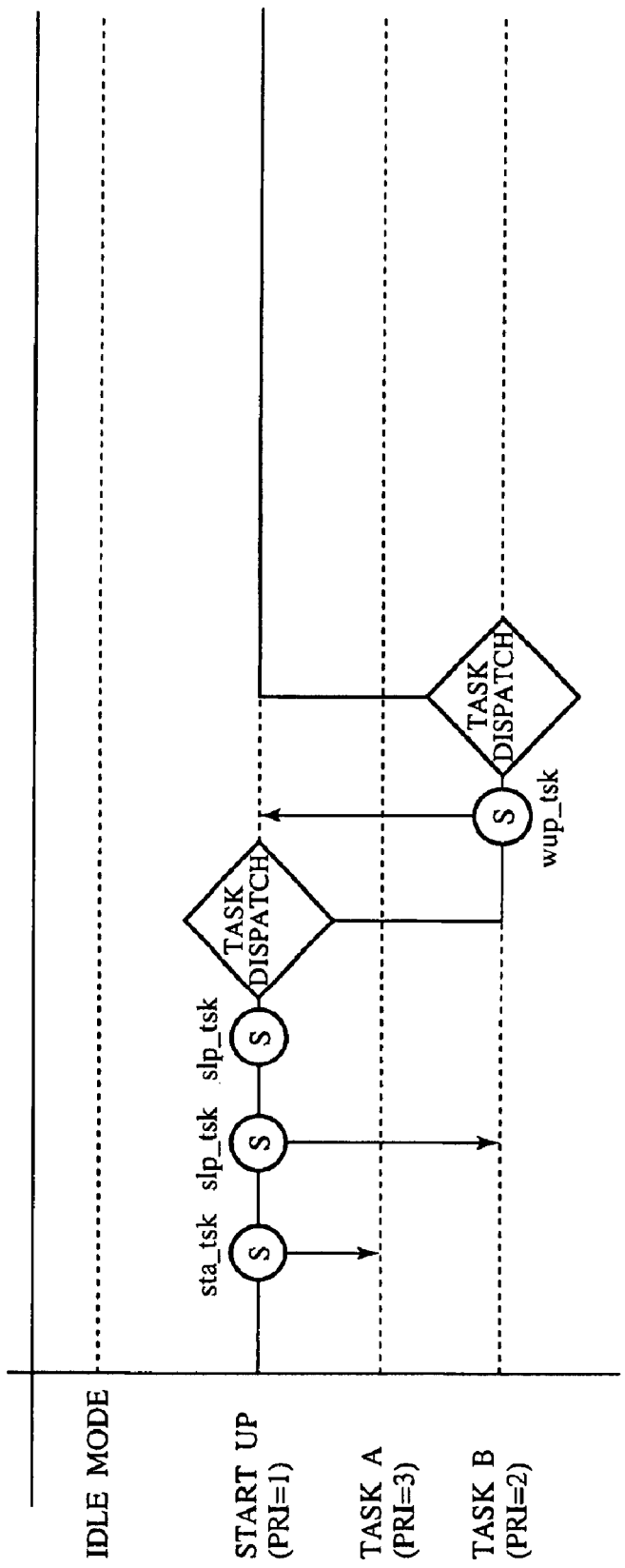
FIG. 12 is an input/output related view showing operation states resulting from the defect of the application program assumed in the first embodiment.

It is assumed that if the program is actually operated, a result shown in FIG. 12 is obtained. When attention is paid to a point at which an execution result processing is finished, the processing is finished at the startup task (alarm setting mode). This means that the program does not satisfy the original specification and that a defect is hidden in the program.

Under these circumstances, by employing the information processing apparatus and the defect analysis program mounted on the information processing apparatus according to the present invention, the user 5 can solve the defect as follows.

[Processing 1]

Figure 13:
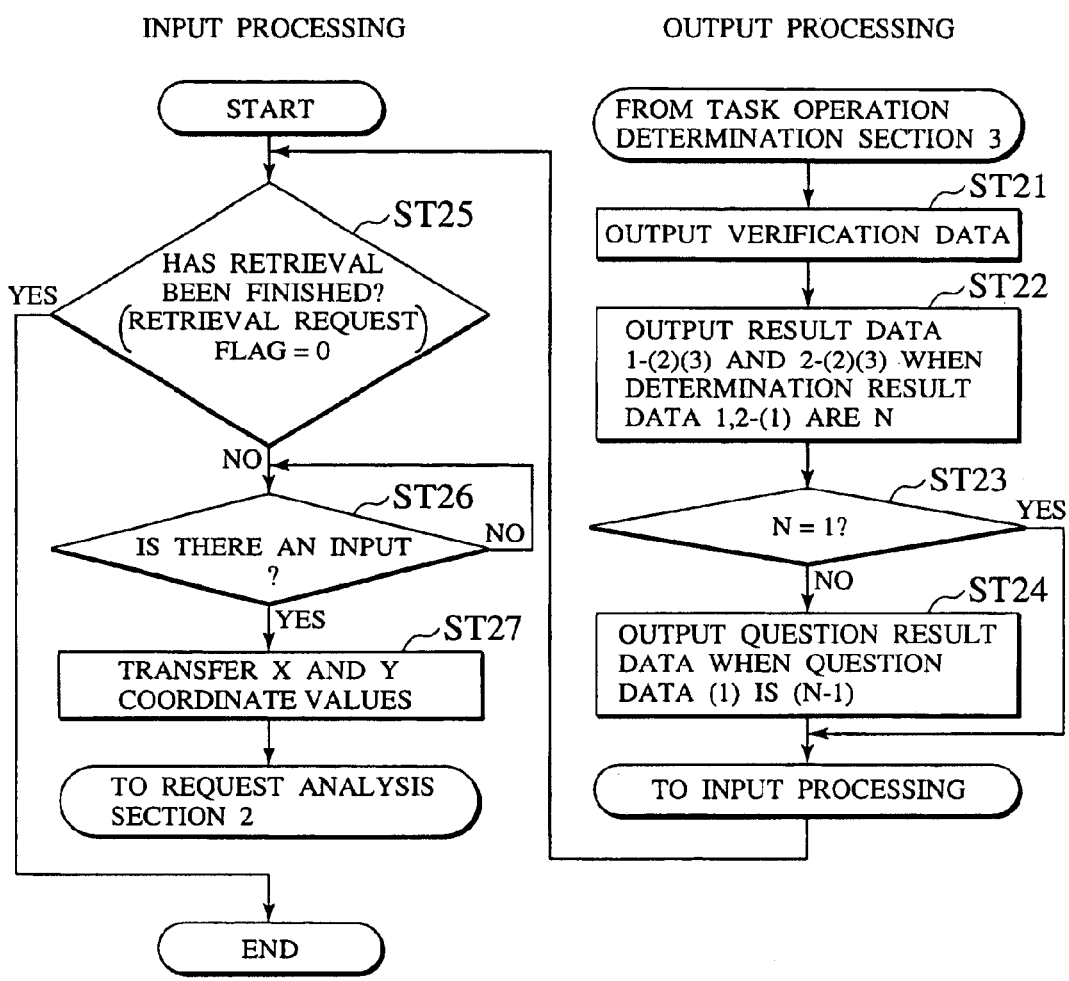
FIG. 13 is a flow chart showing an example of a detailed processing of a user interface section among processing of the defect analysis program shown in FIG. 5.

FIG. 13 shows the processing flow of the user interface section 1.

Figure 14:
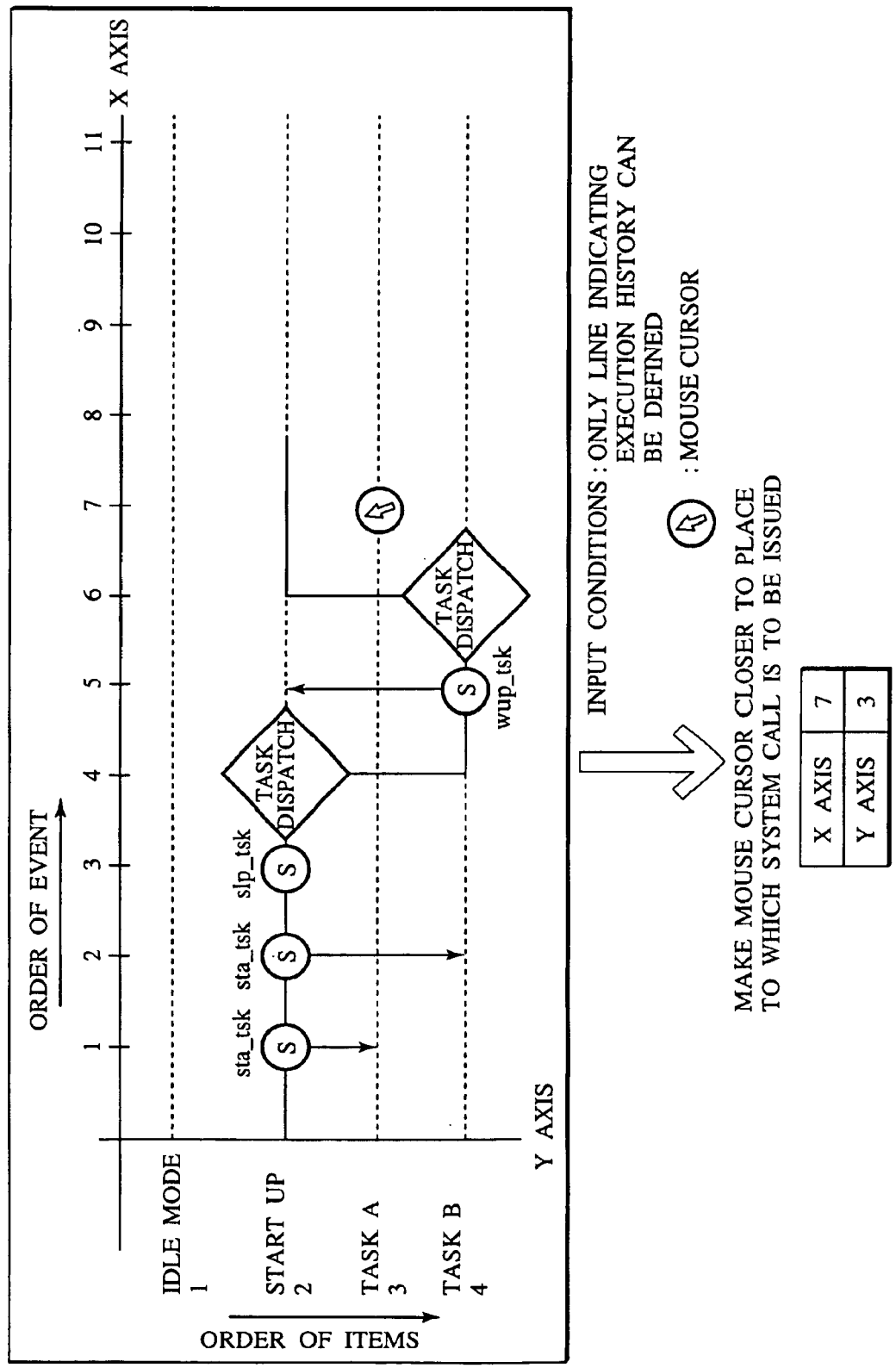
FIG. 14 is an image view showing an example of the presentation of the program operation states shown in FIG. 13 to a user.

The user interface section 1 presents the verification data 14 (FIG. 6) generated in advance by the operation determination section 3 based on the program operation history information 11 to the user 5 (in steps ST21 to ST24). An example of the presentation of the data to the user 5 is shown in FIG. 14. If the operations of the respective tasks of the program and a state in which tasks are changed over are displayed in a time-series manner as shown in FIG. 14, the user 5 can easily point out a defect in the operations of the program thus displayed. It is particularly effective to graphically express the execution history information 11 which is a series of numbers.

Now, the user 5 points out the defective portion of the program and inputs the defective portion thus pointed out (in a step ST26). In this case, it is assumed that a mouse cursor is designated at a position shown in FIG. 14 (which is the position of the task A after a final event). This designated position is the defective portion pointed out by the user 5. According to the original program specification, the task A should be in "RUNNING" state at this point.

The user interface section 1 transfers defective portion data 12 inputted by the user 5 to the request analysis section 2 (in a step ST27) and moves control to the request analysis section 2. The defective portion data 12 transferred at this moment can be recognized simply by the position at which the mouse cursor is designated in FIG. 14, i.e., the coordinate position on the X-axis indicating the order of events and the Y-axis indicating tasks. The defective portion data 12 pointed out by the user 5 is X=7, Y=3.

Figure 15:
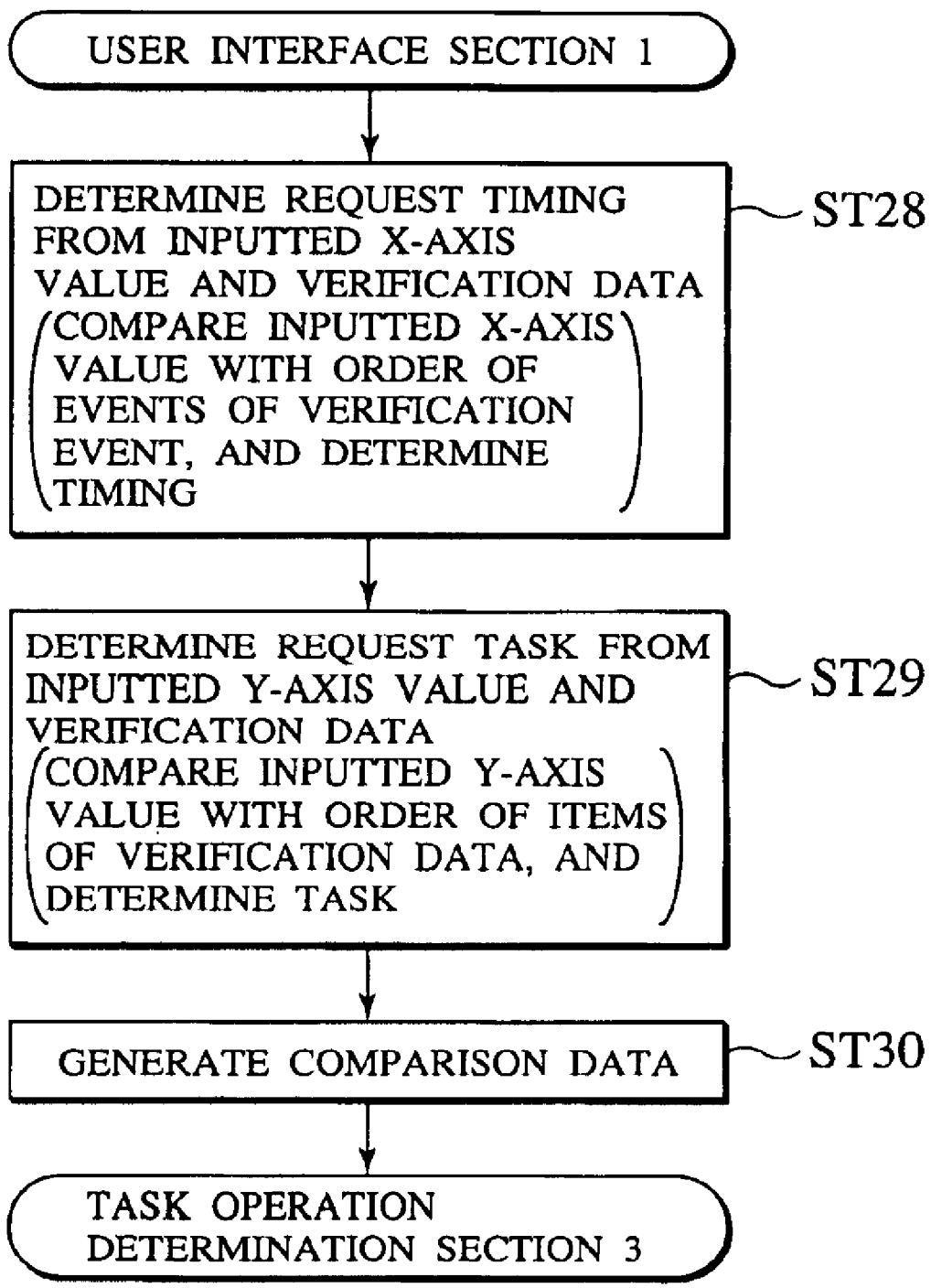
FIG. 15 is a flow chart showing an example of a detailed processing of a request analysis section among the processing of the defect analysis program shown in FIG. 5.

Next, the processing flow of the request analysis section 2 is shown in FIG. 15.

Figure 16:
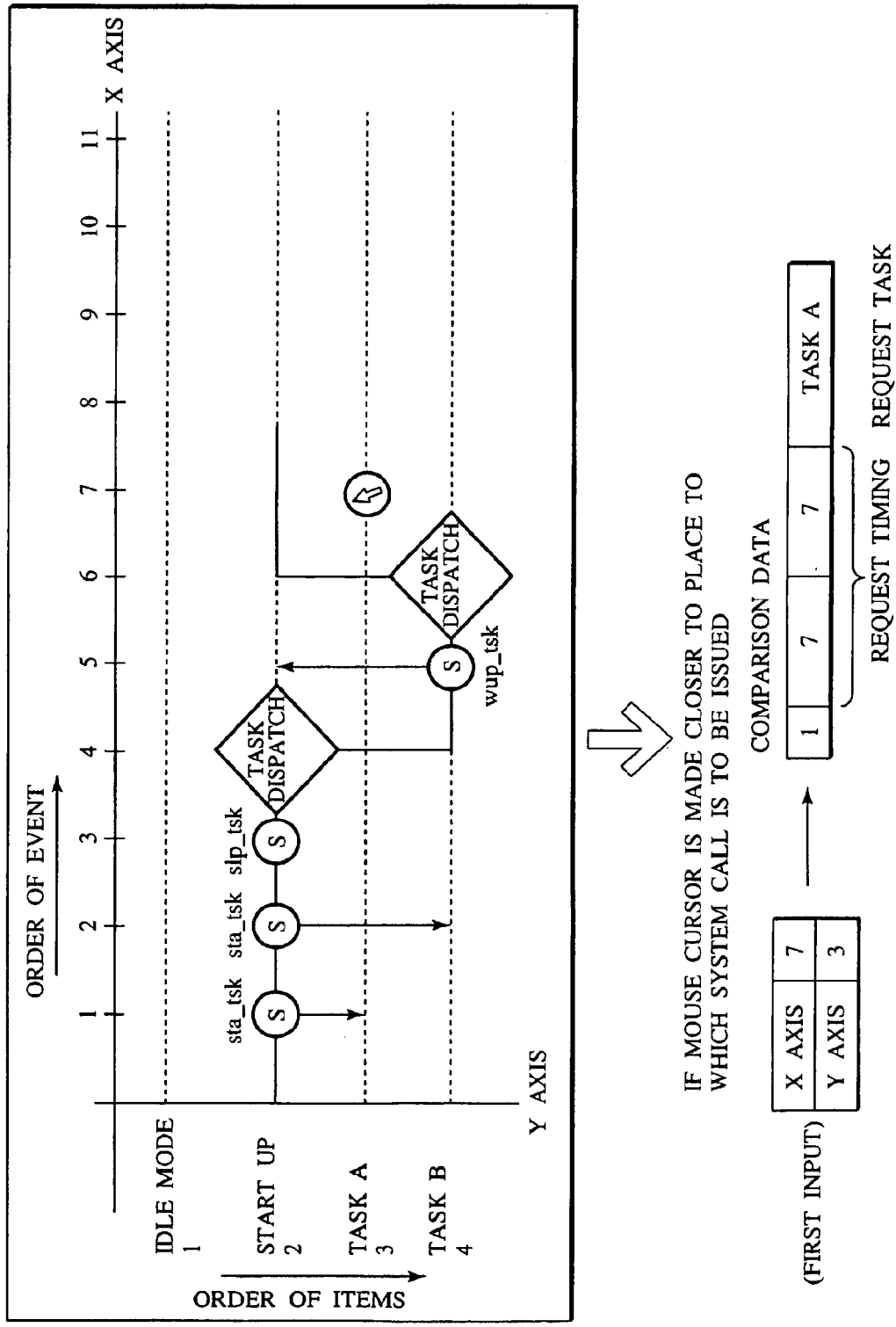
FIG. 16 is an image view showing an example of the presentation of the operation states of the program shown in FIG. 13 to the user.

The request analysis section 2 analyzes a request content from the defective portion data 12 received from the user interface section 1 and the verification data 14 generated in advance by the task operation determination section 3. First, the request analysis section 2 compares an X-axis value with events in the verification data 14, and specifies the request timing of the user 5 (in a step ST28). Next, the request analysis section 2 specifies a task requested by the user 5 from a Y-axis value and the order of items of the verification data 14 (in a step ST29). A processing image at this time is shown in FIG. 16. Namely, the request timing of the user 5 is at the end of events (the position of the seventh event) and the request task is the task A (the third item).

Figure 19:
FIG. 19 shows the states of various data in the first embodiment.

The request analysis section 2 generates comparison data 13 as stated above (in a step ST30), transfers the generated comparison data 13 to the task operation determination section 3, and returns control to the task operation determination section 3. The verification data 14 and the comparison data 13 in this case are shown in FIG. 19.

[First Request]

The request task in this case is the task A and the request timing is at the end of events.

[Processing 2]

Figure 17:
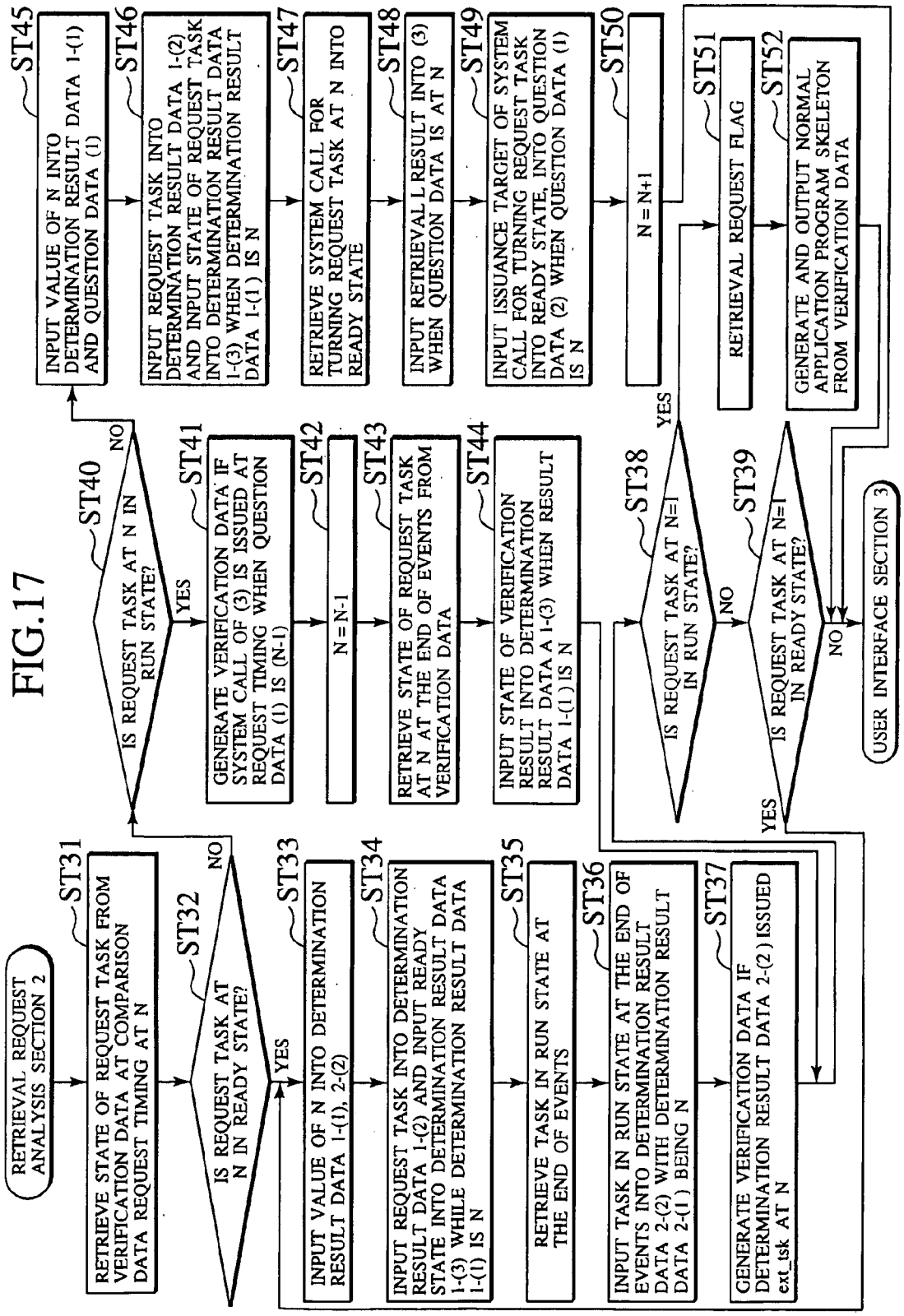
FIG. 17 is a flow chart showing an example of a detailed processing of a task operation determination section among the processing of the defect analysis program shown in FIG. 5.

Next, the processing flow of the operation determination section 3 is shown in FIG. 17.

The task operation determination section 3 compares the comparison data 13 received from the request analysis section 2 with the verification data 14 generated in advance, and retrieves the state of the request task (in a step ST31). If retrieving the verification data 14, the task operation determination section determines that the state of the task A at the end of events is "ready to be executed (READY)" state. A task in "READY" state means a task which is ready to be executed, but cannot be executed because a task having priority over the task or having priority equally to the task is in "RUNNING" state, i.e., in a state in which the task can be executed whenever the task has priority over any task in READY state.

The information processing section according to the present invention finishes the defect analysis processing (or attains its object) when the task pointed out by the user in the first request, i.e., the task A is turned into a "RUNNING" state at the end of events.

Until the task A is turned into "RUNNING" state (or until the cause of the defect is specified), the determination result data 1 and the determination result data 2 to be described hereinafter are generated, a processing which should be originally carried out is specified from the generated determination result data, and the specified processing is reflected on the verification data 14. The states of the respective items of data are shown in FIG. 20 (it is noted that FIG. 20 shows that the processing has been completed).

First, the value of N is inputted in columns (1) of the determination result data 1 and columns (2) of the determination result data 2 (in a step ST33). Here, since the request is the first request, the value of N is "1". Thus, "1" is inputted into both the columns (1) of the determination result data 1 and the columns (2) of the determination result data 2.

Next, the task A which is a request task is inputted into columns (2) of the determination result data 1 and the state of the task A is inputted into columns (3) of the determination result data 1 (in a step ST34).

Next, the operation determination section 3 retrieves a task in "RUNNING" state at the end of events from the verification data 14 (in a step ST35). In this case, the task which is in "RUNNING" state at the end of events is the startup task. The task thus retrieved is inputted into the determination result data 2 (in a step ST36).

Next, the operation determination section 3 generates verification data 14 in a case where the task (or startup task in this case) inputted into the determination result data 2 issues "ext_tsk" (in a step ST37). To be specific, an event in which the startup task issues "ext_tsk" is generated as the seven the vent in the verification data (which follows that task change-over ("Task Dispatch") occurs as the eighth event).

It is then retrieved from the verification data 14 whether the first request task A is turned into "RUNNING" state by reflecting the events (seventh to eighth events) on the verification data 14 (in a step ST38).

The processing steps from ST33 to ST39 are repeated until the first request task A is turned into "RUNNING" state (in a step ST39).

In this case, it is not the task A but the task B that is turned into "RUNNING" state. Accordingly, the processing is returned to the step ST33 in which a processing for turning the task A "RUNNING" state at the end of events is carried out.

[Processing 3]

First, the value of "N" is inputted into both the columns (1) of the determination result data 1 and the columns (1) of the determination result data 2 (in a step ST33). Since the request is the first request, the value of N is "1". Thus, "1" is inputted into the columns of the both data.

Next, the task A which is the request task is inputted into the columns (2) of the determination result data 1 and the state of the task A is inputted into the columns (3) of the determination result data 1 (in a step ST34). It is seen from the verification data 14 that the state of the task A is "READY".

Next, the task operation determination section 3 retrieves a task in "RUNNING" state at the end of events from the verification data (in a step ST35). In this case, it is the task B that is in "RUNNING" state at the end of events. The task B thus retrieved is inputted into the determination result data 2 (in a step ST36).

Next, verification data 14 in a case where the task (or the task B in this case) inputted into the determination result data 2 issues "ext_tsk" is generated (in a step ST37). To be specific, an event in which the task B issues "ext_tsk" is generated as the ninth event in the verification data 14 (which necessarily follows that "Task Dispatch" occurs as the tenth event).

It is then retrieved from the verification data 14 whether the first request task A is turned into "READY" state by reflecting the events (ninth to tenth events) on the verification data 14 (in a step ST38).

In this case, the task A is turned into "RUNNING" state. Therefore, a flag or the like indicating end of processing is set (in a step ST51), and the skeleton of the program which has solved the defect of this time is generated from the verification data 14 on which the seventh to tenth events are reflected, and outputted to a program file 6 (in a step ST52). An example of the generated program stated above is shown in FIG. 21. Steps denoted by symbols (a) and (b) in FIG. 21 are the cause of the defect of this time and its solution, respectively.

As shown in FIG. 20, the task operation determination section 3 transfers the determination result data 1, determination result data 2 and verification result data which have been generated until the first request task A is turned into "RUNNING" state to the user interface section 1, and returns control to the user interface section 1.

The user interface section 1 displays the verification data 14, the determination result data l and the determination result data 2 transferred from the task operation determination section 3 to the user. By doing so, it is possible to present the cause of the defect of this time and its solution to the user 5. It is also possible to present the program operation according to the original specification to the user 5.

Further, since the program which satisfies the original specification is outputted to the program file 6, the user can utilize the program.

(Second Embodiment)

The following four tasks are employed by a program assumed in this embodiment:

(1) startup (task_ID=1, priority=1);
(2) task A (task_ID=2, priority=2);
(3) task B (task ID=3, priority=2); and
(4) task C (task_ID=4, priority=2).
(semaphore used: Semaphore (ID=1, initial semaphore counter=0).

Figure 22:
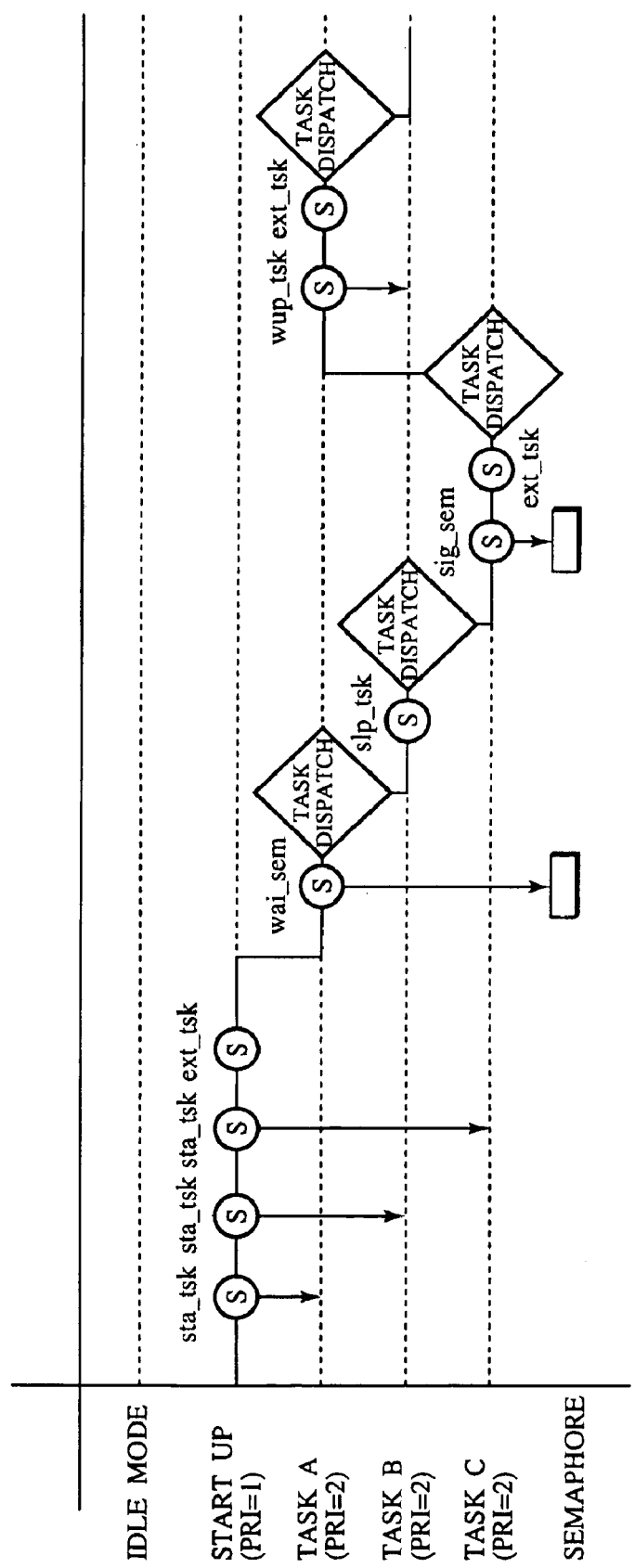
FIG. 22 is an input/output related view showing operation states according to the specification of an application program assumed in the second embodiment.

This program is an application program which was originally generated while assuming such an operation as that shown in the time chart of FIG. 22. Therefore, if attention is paid to a point at which the processing is finished, the processing is finished at the task B, i.e., a finally executed task at the point at which the processing is finished is the task B, which is the original specification of this program.

Figure 23:
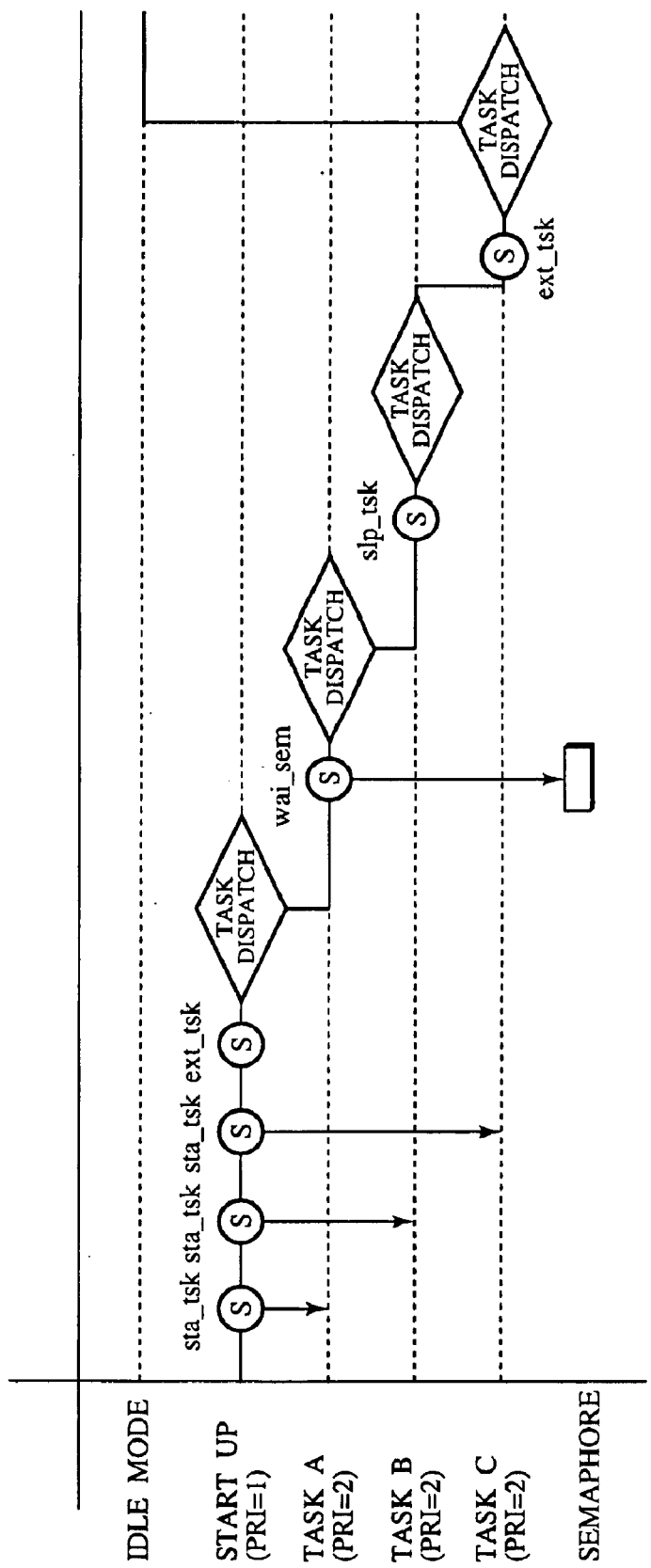
FIG. 23 is an input/output related view showing operation states caused by the defect of the application program assumed in the first embodiment.

It is assumed that if this program is actually operated, a result shown in FIG. 23 is obtained. The execution result shows "Idle Mode" (a state in which no task exists in a ready queue).

Under these situations, a user 5 can solve a defect by utilizing the information processing apparatus and a defect analysis program mounted on the information processing apparatus as follows.

[Processing 1]

A processing flow will be described with reference to a flow chart shown in FIG. 13.

A user interface section 1 displays verification data 14 generated in advance by a task operation determination section 3 based on program operation history information 11 to a user 5 (in steps ST21 to ST24).

Here, the user 5 points out a defective portion and inputs the pointed-out defective portion (in a step ST26). In this case, as in the case of the first embodiment, the user points out the end of events. The designated position is the defective portion pointed out by the user 5. According to an original program specification, the task B should be in "RUNNING" state at this moment.

The user interface section 1 transfers the defective portion data 12 inputted by the user 5 to a request analysis section 2 (in a step ST27), and moves control to the request analysis section 2. The defective portion data 12 pointed out by the user 5 is X=2, Y=4.

The processing flow of the request analysis section 2 will be described with reference to a flow chart shown in FIG. 15.

The request analysis section 2 analyzes a request content from the defective portion data 12 received from the user interface section 1 and the verification data 14 generated in advance by the task operation determination section 3. First, the request analysis section 2 compares an X-axis value with events in the verification data, and specifies request timing at which the user 5 requests (in a step ST28). Next, the operation determination analysis section 2 specifies a task requested by the user from a Y-axis value and the order of items of the verification data (in a step ST29). In this case, the request timing of the user 5 is at the end of events (the position of the twelfth event) and the request task is the task B (fourth item).

The request analysis section 2 generates comparison data 13 as stated above (in a step ST30), transfers the generated comparison data 13 to the task operation determination section 3, and moves control to the task operation determination section 3. The verification data 14 and the comparison data 13 at this time are shown in FIG. 24.

[First Request]

The request task of the user 5 in this case is the task B and request timing is at the end of events.

[Processing 2]

Next, the processing flow of the task operation determination section 3 will be described with reference to a flow chart shown in FIG. 17.

The task operation determination section 3 compares the comparison data 13 received from the request analysis section 2 with the verification data 14 generated in advance, and retrieves the state of the request task (in a step ST31). If retrieving the verification data 14 shown in FIG. 24, the task operation determination section 3 determines that the state of the task B "at the end of events" which is the request timing is "WAITING" state (in steps ST32 and ST40). A task in "WAITING" state means a task in a state in which it cannot be executed because some condition for allowing the execution of the task is not satisfied, i.e., in a state in which the task waits for some condition to be satisfied.

The information processing apparatus according to the present invention finishes the defect analysis processing (attains its object) when the task pointed out by the user in the first request, i.e., the task B is turned into "RUNNING" state at the end of events.

In this case, before turning the task B into "RUNNING" state, it is necessary to turn the task B into "READY" state. This is because the task in "WAITING" state cannot be directly turned into "RUNNING" state. The processing will be described hereinafter.

First, the value of N is inputted into columns (1) of determination result data 1 and defect solution question data (in a step ST45). Since the request is the first request, the value of N is "1". Thus, "1" is inputted into the columns.

Next, the task B which is the request task is inputted into column (2) of the determination result data 1, and the state of the task B ("WAITING") is inputted into column (3) of the determination result data 1 (in a step ST46).

Next, the task operation determination section 3 retrieves a system call capable of turning the state of the request task B which is the first request into "READY" state from a system call correspondence table 7 (in a step ST47). The system call correspondence table 7 stores program function corresponding information to specify a solution, an example of which is shown in FIG. 18.

In this case, according to the verification data 14 shown in FIG. 24, the task B is in "WAITING (for wake-up)" state by "Slp_tsk", so that the task operation determination section 3 retrieves a system call corresponding to "slp_tsk" from the system call correspondence table 7 shown in FIG. 18. If retrieving a system call correspondence table 7 shown in FIG. 18, "slp_tsk" is in the second entry and a corresponding system call is "wup_tsk". If this "wup_tsk" is issued, it is possible to turn the state of the task B from "WAITING" state into "READY" state. "Wup_tsk" of the retrieval result is inputted into column (3) of the defect solution question data (in a step ST48).

Next, an issuance target task to which "wup_tsk" which is the system call for turning the state of the task B from "WAITING" state into "READY" state is issued, is inputted into column (2) of the defect solution question data (in a step ST49). In this case, the issuance target task is the task A.

It is not mechanically decided "when" and "where" this "wup_tsk" is issued. This is because the processing changes depending on issuance timing and issuance place. Accordingly, the user 5 is inquired as to "when" and "where" this system call "wup_tsk" should be issued. Data for this inquiry is the defect solution question data.

It is assumed that an inquiry made by this defect solution question data is the second request (N is incremented by 1 (in a step ST50)). The task operation determination section 3 returns control to the user interface section 1, the verification data and the defect solution question data are presented to the user 5 to urge the user to input an answer to the question.

[Second Request]

In this case, it is assumed that the request task requested by the user 5 is the task A and that request timing is "after the system call "wai_sem" is issued".

[Processing 3]

Control is returned to the user interface section 1, which section transfers the defective portion data 12 inputted by the user 5 to the request analysis section 2 (in a step ST27) and returns control to the request analysis section 2. The defective portion data transferred at this time is X=6 and Y=3.

The request analysis section 2 generates comparison data 13 (in a step ST30), transfers the comparison task 13 thus generated to the task operation determination section 3, and returns control to the task operation determination section 3. The verification data 14 and the comparison data 13 at this time are shown in FIG. 25.

The task operation determination section 3 compares the comparison data 13 received from the request analysis section 2 with the verification data 14, and retrieves the state of the request task (in a step ST31). If retrieving the verification data 14 shown in FIG. 25, the task operation determination section 3 determines that the state of the task A at the request timing is "WAITING (for acquiring semaphore resource)" (in steps ST32 and ST40). In this case, it is necessary to turn the state of the task A from "WAITING" into "READY", which processing will be described below.

First, the value of N is inputted into columns (1) of the determination result data 1 and the defect solution question data (in a step ST45). Since the request is the second request, the value of N is "2". Thus, "2" is inputted into the columns of both of the data.

Next, the task A which is the request task is inputted into the column (2) of the determination result data 1, and the state of the task A ("WAITING") is inputted into the column (3) thereof (in a step ST46).

Then, the task operation determination section 3 retrieves a system call capable of turning the state of the request task A which is the second request into "READY" from the system call correspondence table 7 (in a step ST47). The corresponding system call is "sig_sem". If this "sig_sem" is issued, it is possible to turn the state of the task B from "WAITING" into "READY". The retrieval result of "sig_sem" is inputted into the column (3) of the defect solution question data (in a step ST48).

Next, an issuance target task to which the system call "sig_sem" for turning the state of the task B from "WAITING" into "READY" is issued, is inputted into the column (2) of the defect solution question data (in a step ST49). In this case, the issuance target task is the task C.

It is not mechanically decided "when" and "where" the system call of "wup_tsk" is issued. This is because the processing changes depending on issuance timing and issuance place. Accordingly, the user 5 is inquired as to "when" and "where" the system call should be issued.

It is assumed that the question made by this defect solution question data is the third request. N is incremented by 1, and control is returned to the user interface section 1 (in a step ST50). The user interface section 1 presents the verification data and the defect solution question data to the user 5 and urges the user 5 to input an answer to the question.

[Third Request]

In this case, it is assumed that the request task requested by the user 5 is the task C and that request timing is "before system call "ext_tsk" is issued".

[Processing 4]

Control is returned to the user interface section 1, which section transfers the defective portion data 12 inputted by the user 5 to the request analysis section 2 (in a step ST27), and moves control to the request analysis section 2.

The request analysis section 2 generates comparison data (in a step ST30), transfers the comparison data 13 thus generated to the task operation determination section 3, and moves control to the task operation determination section 3. The verification data 14 and the comparison data 13 at this time are shown in FIG. 26.

The task operation determination section 3 compares the comparison data 13 received from the request analysis section 2 with the verification data 14, and retrieves the state of the request task (in a step ST31). If retrieving the verification data 14 shown in FIG. 25, the task operation determination section 3 determines that the state of the task C at the request timing, i.e., "before the system call "ext_tsk" is issued" is "RUNNING" (in steps ST32 and 40).

If the state of the request task at the request timing is "RUNNING", verification data 14 in a case where the system call one time before N, i.e., when the defect solution question data is (N−1) is issued at the request timing, is generated (in a step ST41). In this case, verification data when the task C issues the system call of "sig_sem" when the defect solution question data is N=2, is generated (see the verification data shown in FIG. 27).

Next, the state of the second request task at the end of events is retrieved from the verification data 14 (in steps ST42 and ST43).

The retrieval result shows that the second request task A is turned into "RUNNING" state. Thus, the state of the task A written in the determination result data 1 is changed to "RUNNING" (in a step ST44).

By turning the state of the secondary request task into "RUNNING", the third request is satisfied. However, the state of the first request task B remains "READY". Therefore, the task operation determination section 3 transfers the verification data, the determination result data and the defect solution question data (in the first request) which are generated so far, to the user interface section 1, and returns control to the user interface section (in steps ST38 to ST39).

Thereafter, following the processing described so far, the processing steps are repeated until the first request task B is turned into "RUNNING" state at "the end of events" which is the first request timing. The states of the verification data, the comparison data, the determination result data 1, the determination result data 2, and the defect solution question data are shown in FIGS. 24 to 29.

The verification data shown in FIG. 29 satisfies the original program specification. The determination result data 1 and 2 and the defect solution question data shown in FIG. 29 are the cause of the defect this time. The information processing apparatus according to the present invention is capable of interactively presenting the cause of the defect of the program and its solution to the user 5 by presenting the respective data to the user 5.

Furthermore, in this embodiment, at the time the processing is finished, a program skeleton can be automatically generated from the verification data shown in FIG. 29 and presented to the user as in the case of the first embodiment.

As described so far with reference to the first and second embodiments, by employing the information processing apparatus on which the defect analysis program is mounted according to the present invention, it is possible to interactively specify the cause of the defect and its solution, and to easily acquire a program operation along the original specification and a program along the original specification.

In other words, it is possible to specify the cause of the defect and its solution from the defective portion pointed out by the user and the program execution history information in an interactive manner, and to present a program operation on which the solution is reflected to the user.

Moreover, it is possible to automatically generate a program which has solved the defect from the specified cause of the defect and the specified solution and to present the program to the user.

As a result, it is possible to facilitate the program defect analysis operation, shorten time required for the defect analysis compared with the time required conventionally and to reduce program development cost and development time.

(Third Embodiment)

An application program development assistance system according to the present invention will be described by way of a third embodiment. In this present embodiment, a description will be given to an example of developing an application program that corresponds to a real time OS ($\mu$ITRON 3.0 specification) incorporated into a microcomputer.

[Configuration of Hardware Resource]

Figure 30:
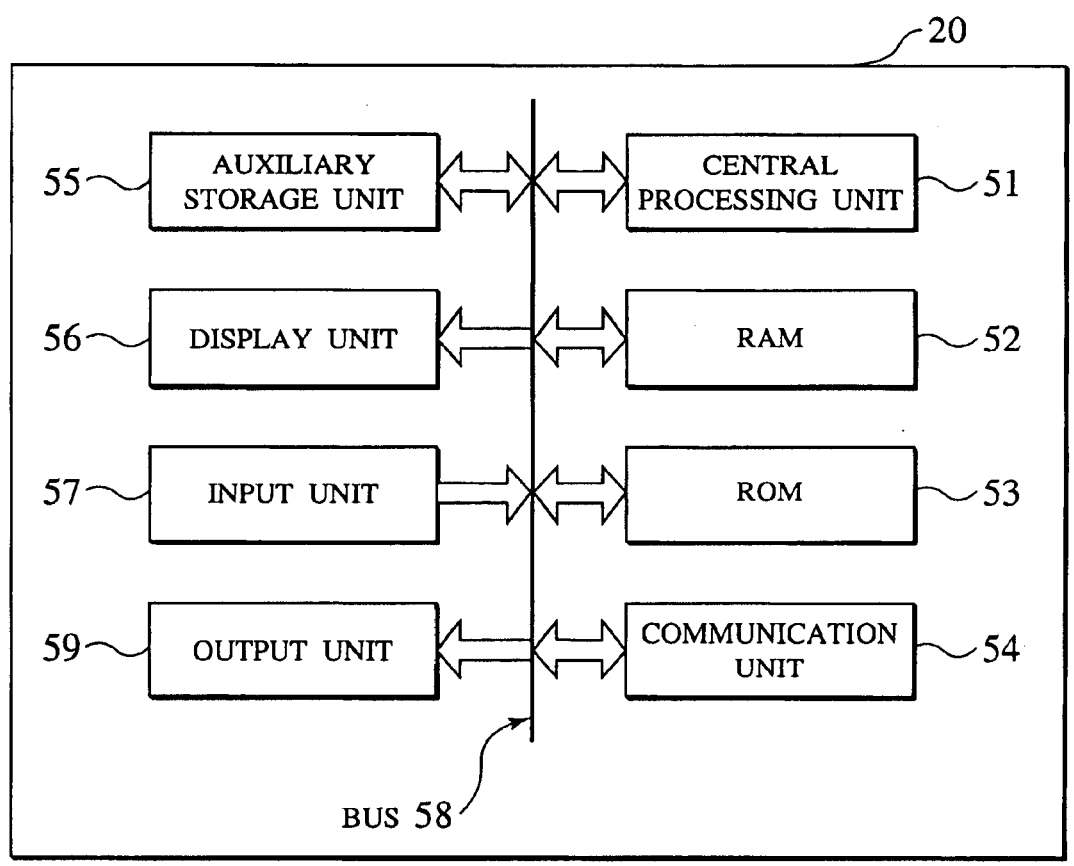
FIG. 30 is a block diagram depicting a configuration of a hardware resource according to the third embodiment.

FIG. 30 is a schematic view showing a configuration of a hardware resource for implementing an application development system 20 according to the present embodiment.

As shown in FIG. 30, the hardware resource 10 comprises a central processing unit (CPU) 51 and a RAM 52. In the present embodiment, the central processing unit (CPU) 51 and RAM 52 are connected to a ROM 53, a communication device 54, an auxiliary storage device 55, a display device 56, an input device 57, and an output device 59 via a bus 58.

The ROM 53 and the auxiliary storage device 55 record computer program codes. This computer program supplies a command to the central processing unit 51 or the like in collaboration with an operating system on the application development system 50. The computer program codes are executed by being loaded on the RAM 52. These computer program codes are compressed or divided into plurality that includes the compressed codes. Then, these codes can be recorded in a plurality of media.

In addition, in the present embodiment, user interface hardware for inputting data from, and/or outputting data to, the application development system 20 includes: an input device 57 for inputting screen position information or character information; a display device 56 for representing user with image data; and an output device 59. The input device 57 includes a pointing device or keyboard and the like, for example. In addition, a data input and/or output method includes: receiving input data from another computer or the like via the communication device 54 or a medium such as auxiliary storage device 55. The display device 56 includes a monitor or a printer wherein data is outputted in a visual manner.

In this manner, the application development system 20 enables implementation on a personal computer or workstation; a hand held information terminal; and a network computer; or implementation in a hardware configuration caused by a combination of these devices. However, the hardware configuration is merely provided for the illustrative purpose, and all constituent elements may not be those required for the application development system 20.

[Application Development System Configuration]

Figure 31:
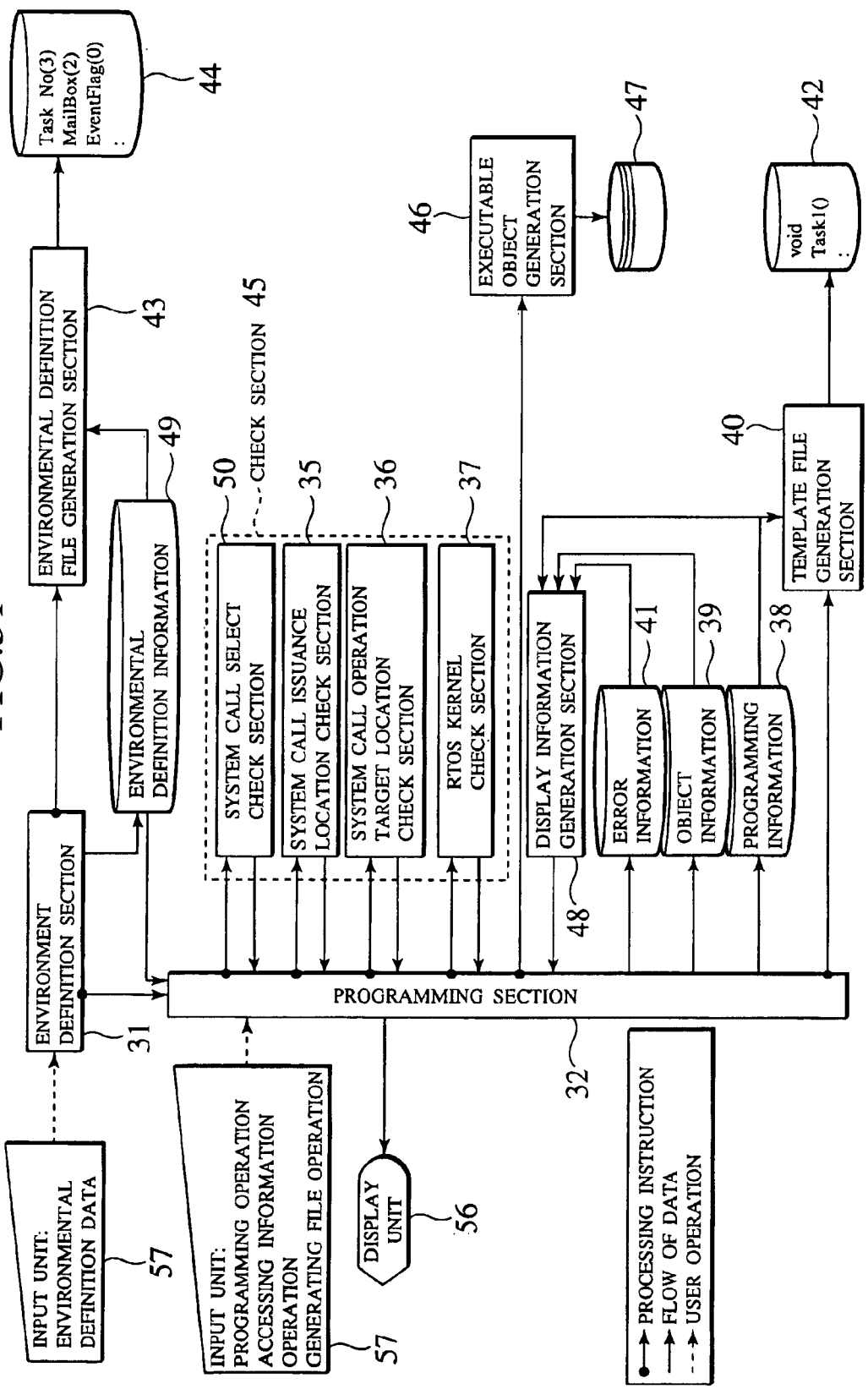
FIG. 31 is a block diagram depicting the entire configuration of an application program development system according to the third embodiment.

An application development program is executed based on the above described hardware configuration, whereby an application development system according to the present invention is virtually constructed in such hardware configuration. FIG. 31 is a block diagram schematically depicting a configuration of an application development system that is constructed according to the present embodiment.

As shown in the figure, the application development system according to the present embodiment comprises: an environment definition section 31; a programming section 32; a template file generation section 40; an environment definition file generation section 43; a check section 45; an execution object section 46; and a display information generation section 48.

The environment definition section 31 analyzes inputted environment definition data, and supplies the analysis result to the programming section 32. The environment definition data includes: the number of objects under the control of an RTOS utilized by an application system to be developed or its initialization settings; and initialization data associated with external/internal interrupt factors that will occur with a microcomputer in which a development application system operates. In addition, this environment definition section 31 generates environment definition information 49 from the analysis result. The environment definition information is inputted to an environment definition file generation section 43 when an environment definition file is generated.

The programming section 32 constructs a development program through programming operation performed via the input device 57.

The template file generation section 40 receives instruction of generating a template file from the programming section 32; generates and outputs a template file 42 based on the programming information 38. In addition, the environment definition file generation section 43 forms inputted environment definition data in a file format.

The check section 45 virtually constructs environment according to the operation rules of execution environment in which an application program targeted for development is executed based on environment definition data; executes a development program under the virtual environment; and performs operational checks. Specifically, according to the present embodiment, the check section includes: a system call selection check section 50; a system call issuance position check section 35; a system call operation target position check section 36; and an RTOS kernel check section 37.

The system call selection check section 50 judges whether or not a selected system call actually issues under the execution environment targeted for programming. The system call issuance position check section 35 judges whether or not a system call actually issues at a position (or timing) at which such system call is assumed to issue.

The system call operation target position check section 36 judges whether or not a system call is able to be operate when the system call actually issues with a target with which such system call is assumed to issue. The RTOS kernel check section 37 makes operational checks for an RTOS that is an OS operating on a hardware resource according to the present embodiment.

In addition, the execution object section 46 compiles a developed program, and outputs the program as an execution object file (electronic file) 47. The display information generation section 48 generates each item of information so that such information can be outputted to a display device 56 such as monitor.

[GUI (Graphic User Interface) Configuration]

Figure 32:
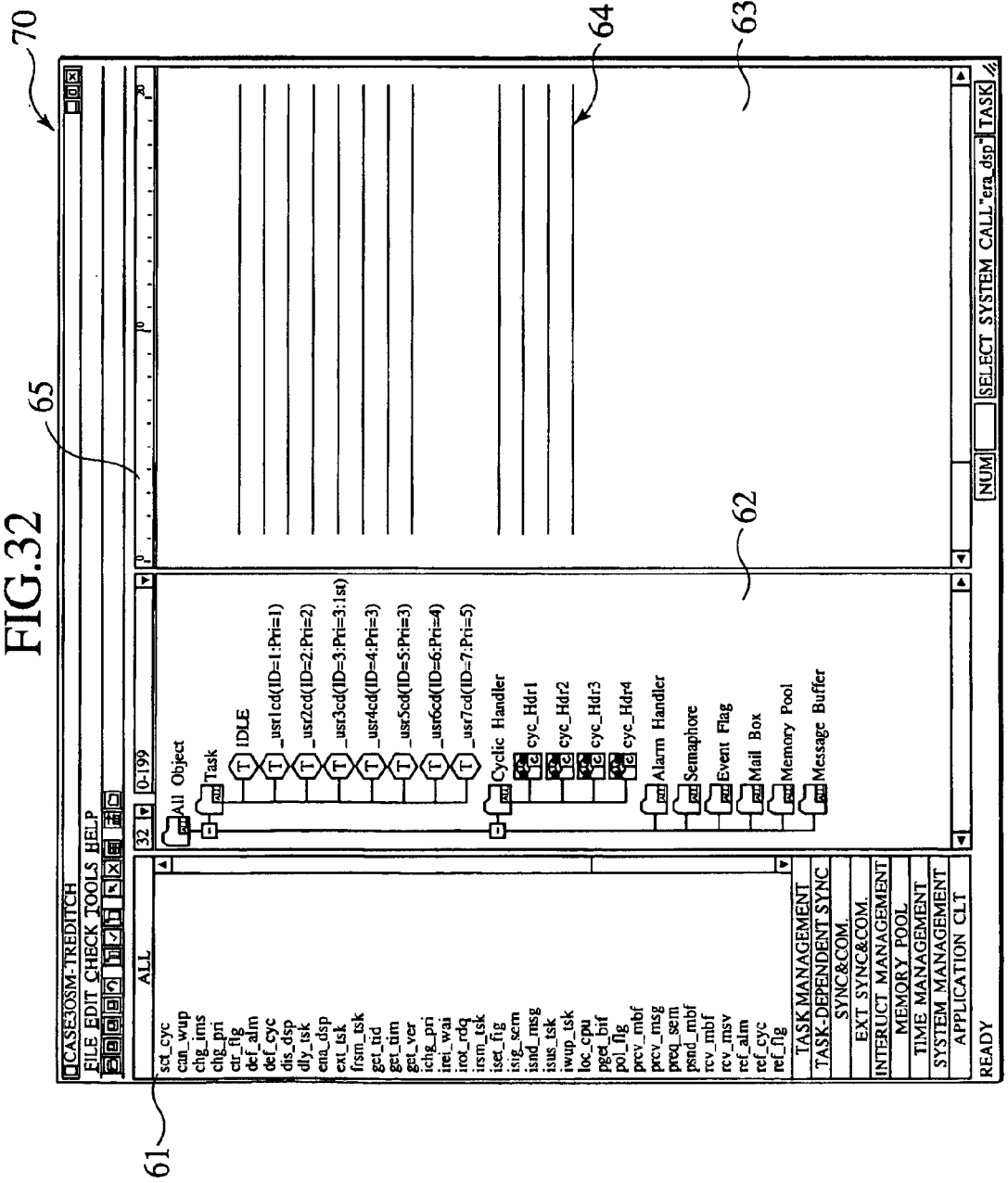
FIG. 32 is an illustrative view illustrating a GUI screen configuration of a programming device 32 according to the third embodiment.
Figure 33:
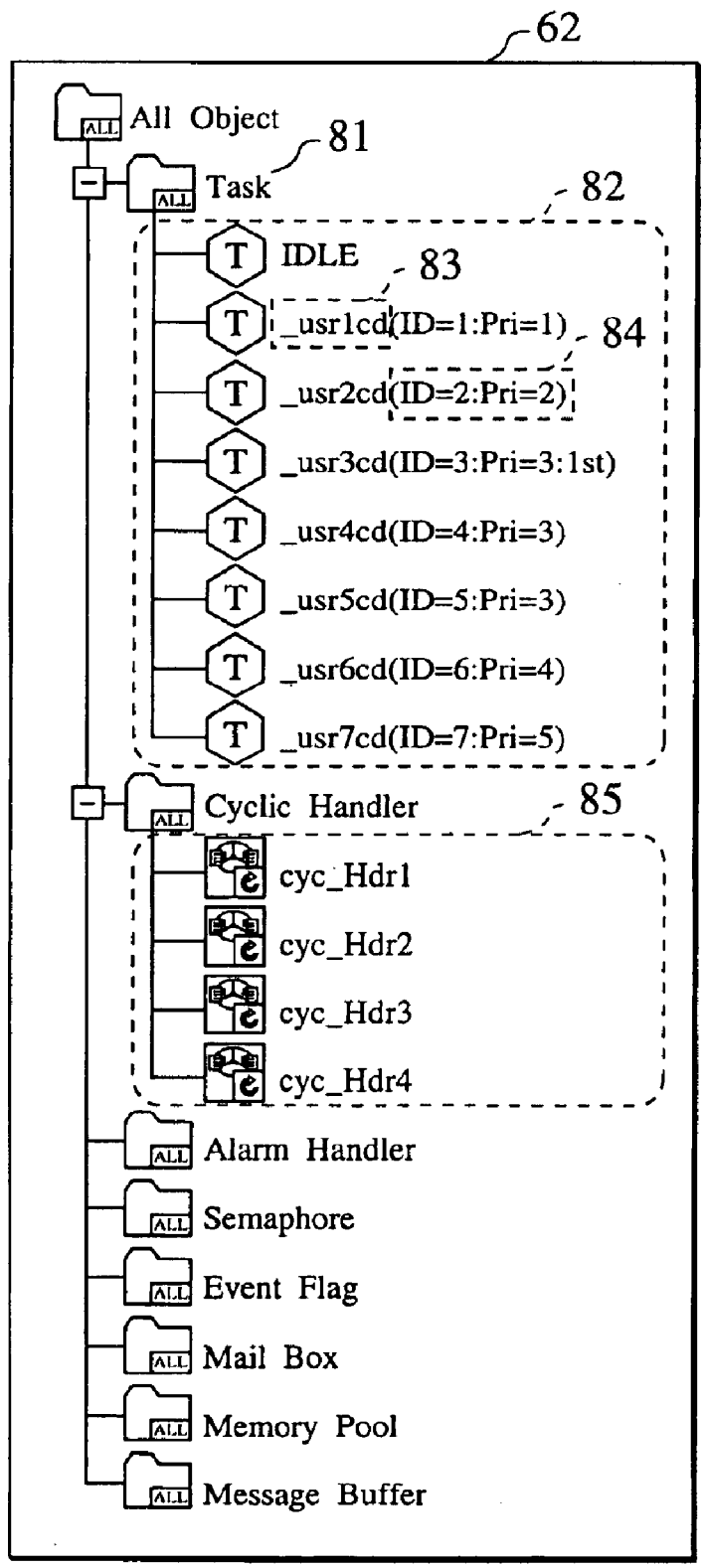
FIG. 33 is an illustrative view illustrating a screen configuration of an object display pane according to the third embodiment.

Now, a configuration of a GUI (Graphic User Interface) that is an interface of the programming device 32 will be described here. FIG. 32 and FIG. 33 each show a screen configuration displayed on the display device 56.

This GUI is displayed as a window 70 on the display device 56. This window 70 includes: a system call selection pane 61 for selecting a desired system call to be issued in a program; an object display pane 62 for displaying by grouping by objects/interrupt factors, the objects (hereinafter, referred to as "object") is provided by the execution environment and under the control of the RTOS available for use in a program; and a programming work pane 63 for performing programming.

The programming work pane 63 comprises: a sequence line 64 provided by each object to specify a system call issuance position (object) or an operation position (object); a logical system call issuance timing in a program; and a scale pane 65 for defining an issuance order that is an interface.

The programming work pane 63 is composed of: a task section programming work pane for performing task section programming; and a handler section programming work pane for performing task independent section programming by task independent sections.

The environment definition information 49 acquired when the programming device 32 is activated is displayed on an object display pane 62, as shown in FIG. 33.

The object display pane 62 includes a task object group 82 that displays objects/interrupt factors available in a program. In this task object group 82, groups such as cycle start handler group 85 are divided. An object name 83 is displayed in individual objects belonging to each group. In the case where initial state settings are performed, the object name and object initialization information 84 are displayed altogether. Only an object group name is displayed with respect to an undefined object.

That is, for example, in the object initialization information on task object "_usr3cd" in the figure, an "ID" denotes task ID information; a "Pri" denotes task priority information; and "1st" denotes initialization task information (this first means an execution state task in application program processing). Namely, in the present embodiment, in the case where programming is started, "_usr3cd" first issues a system call in a programming work pane 63.

In addition, in the present embodiment, system call issuance operation is performed by placing one system call on a sequence line 64 of an execution state task at one scale that exists in a scale pane 65 after a system call to be issued has been selected.

In this manner, a system call issuance position can be assumed. Programming is constructed when a scale position 0 is defined as a starting point, and program processing is performed sequentially from the scale position 0. In addition, in the present embodiment, this scale pane 65 is equipped with a function for preventing a system call from being issued with its spaced scale intervals.

In the case where an issued system call requires specification of an operation target object, one specify on the sequence line 64 at the same scale position as a system call issuance position that the operation target object has. This position is assumed to be a system call operation target position. When a system call operation target position is selected, the pane is equipped with a function incapable of selecting a scale position different from the system call issuance position.

During operation for system call issuance, in the programming work pane 63 during issuance, there are provided edit functions such as adding operation to be issued at a maximum value that the scale can issue; an issued system call inserting operation for a position where the issued system call that exists in the programming work pane 63; deleting operation for an issued system call; an issuance scale position moving operation (in the case where a plurality of system calls are issued); a system all type change operation; a system call argument change operation; and system call operation target position movement.

[Processing Steps of Application Development System]

Figure 34:
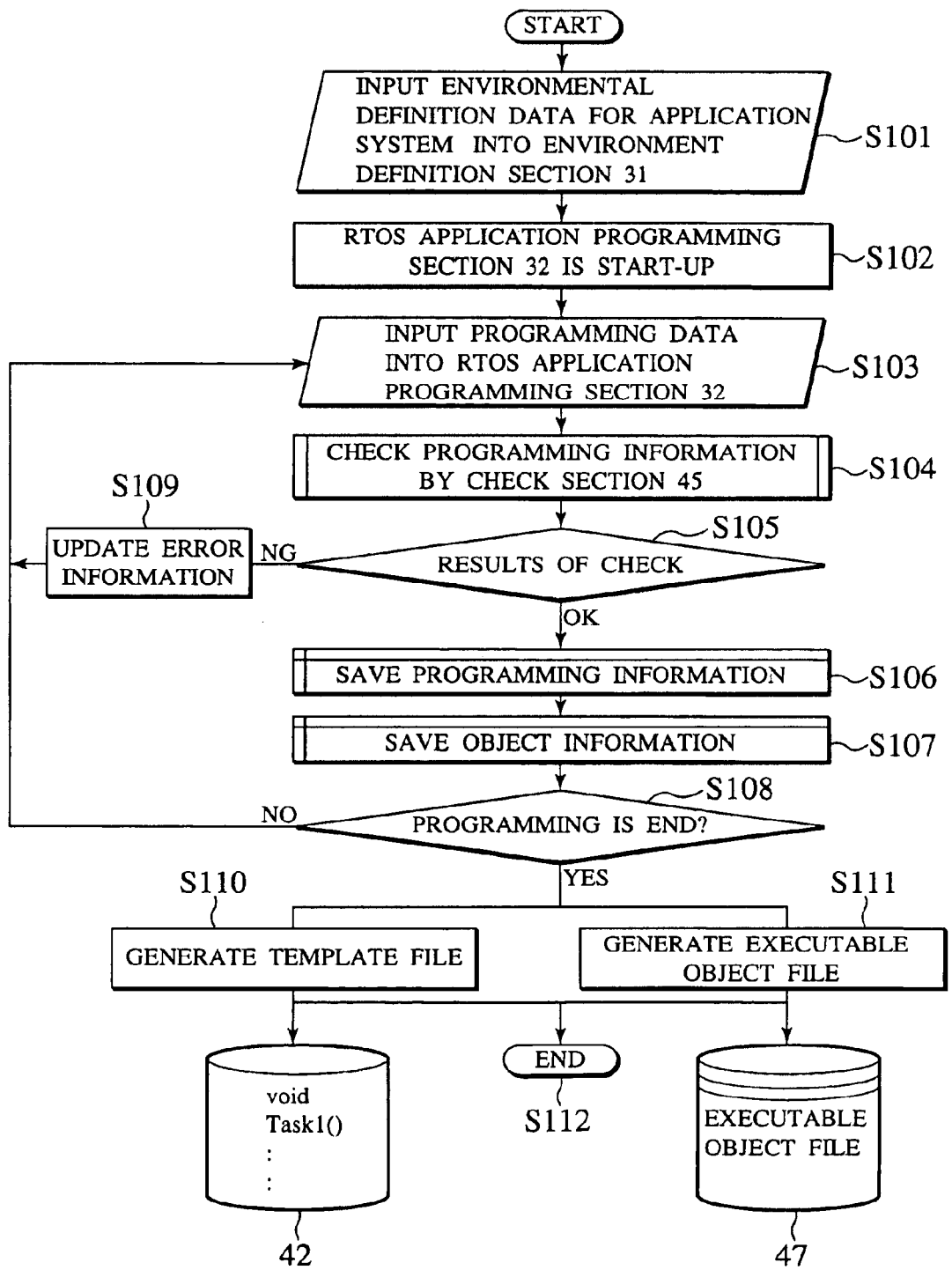
FIG. 34 is a flow chart showing a flow of developing an application system by using a development device according to the third embodiment.

The above described application development system 20 operates as follows. FIG. 34 is a flow chart showing an operation of the application development system 20 according to the present embodiment.

First, required environment definition data is inputted from an input device 57 to an environment definition device 31 (S101).

After the data required for the environment definition device 31 is ready, information for activating the programming device 32 is inputted from the input device 57 to the environment definition device 31. The environment definition device 31 that has received the input activates a programming device 32 (S102). During this activation, a GUI (Graphic User Interface) that is an interface of the programming device 32 is displayed on the display device 56.

The programming device 32 has a programming operation input from the input device 57 after the device 32 has been activated. A user inputs programming data via the input device 57 through programming operation (S103).

Next, a check section 45 checks programming information on the inputted program (S104).

Then, it is judged whether or not an error occurs as the check result (S105). If an error occurs, error information 41 is updated. In addition, display information is produced by a display information generation section 48 with respect to the content of the error, and is displayed on a display device 56. At the step S105, in the case where it is judged that no error occurs, programming information 38 and object information 39 are saved (S106 and S107).

Thereafter, it waits to select whether or not programming is terminated (S108). In the case where programming is continued, it returns to the step S103 at which input of programming data is received again. At the step S108, in the case where the end of programming is selected, a template file 42 is generated at a template file generation section 40, and is outputted (S110). At an execution object generation section 46, an execution object file 47 is generated, and is outputted (S111), and a jib is terminated (S112).

Figure 35:
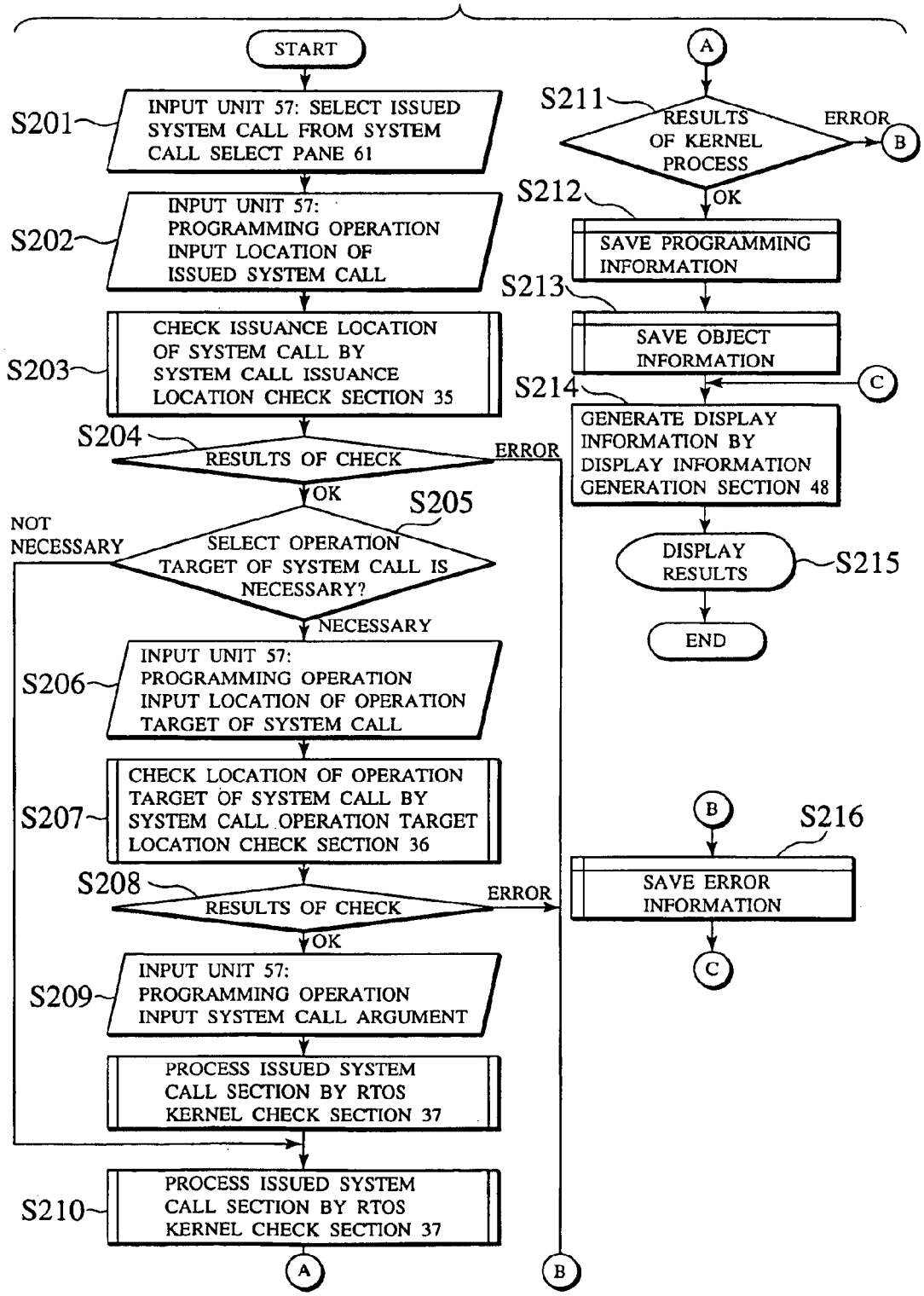
FIG. 35 is a flow chart showing a flow of processing a development device when a system call is issued by using the programming device 32 according to the third embodiment.

FIG. 35 shows processing steps from reception of programming data input to displaying the input result. Programming for interfacing a window 70 displayed on the display device 56 is performed in accordance with the processing steps.

A system call to be issued is selected by a system call selection pane 61 through the input device 57 (S201). In addition, a position at which a system call is issued is inputted through the input device 57 (S202).

Based on these inputted data, a system call issuance position is checked at a system call issuance position check section (S203).

Then, the check result is judged. If no error occurs, a request is made to select whether or not a operation target of an issuance system call is selected (S205). In the case where a selection of an operation target is not required, an issuance system call kernel section is processed at an RTOS kernel check device (S201).

In the case where it is required to select an operation target of the issuance system call at the step S205, a programming operation system call operation target position is inputted via the input device 57 (S207). A system call operation target position is checked at a system call target position check section 36 (S207). It is judged as to whether or not an error occurs with the content of the check result (S208). If no error occurs, a system call argument for programming operation is inputted by the input device 57 (S209). Then, an issuance system call kernel section is processed at the RTOS kernel check section 37 (S210).

After the issuance system call kernel section has been processed at the step S210, the content of kernel processing is judged (S211). In the case where no error occurs at this step S211, programming information 38 is saved (S212), and object information 39 is saved (S213). Then, display information is generated at a display information generation section 48 (S214), the generation result is displayed on the display device 6 (S216), and processing terminates.

If an error occurs at the step S204, S208, or S211, error information 41 is stored (S216). Then, the error information is displayed (S215), and processing terminates.

[Operation Issuing a System Call]

Figure 36:
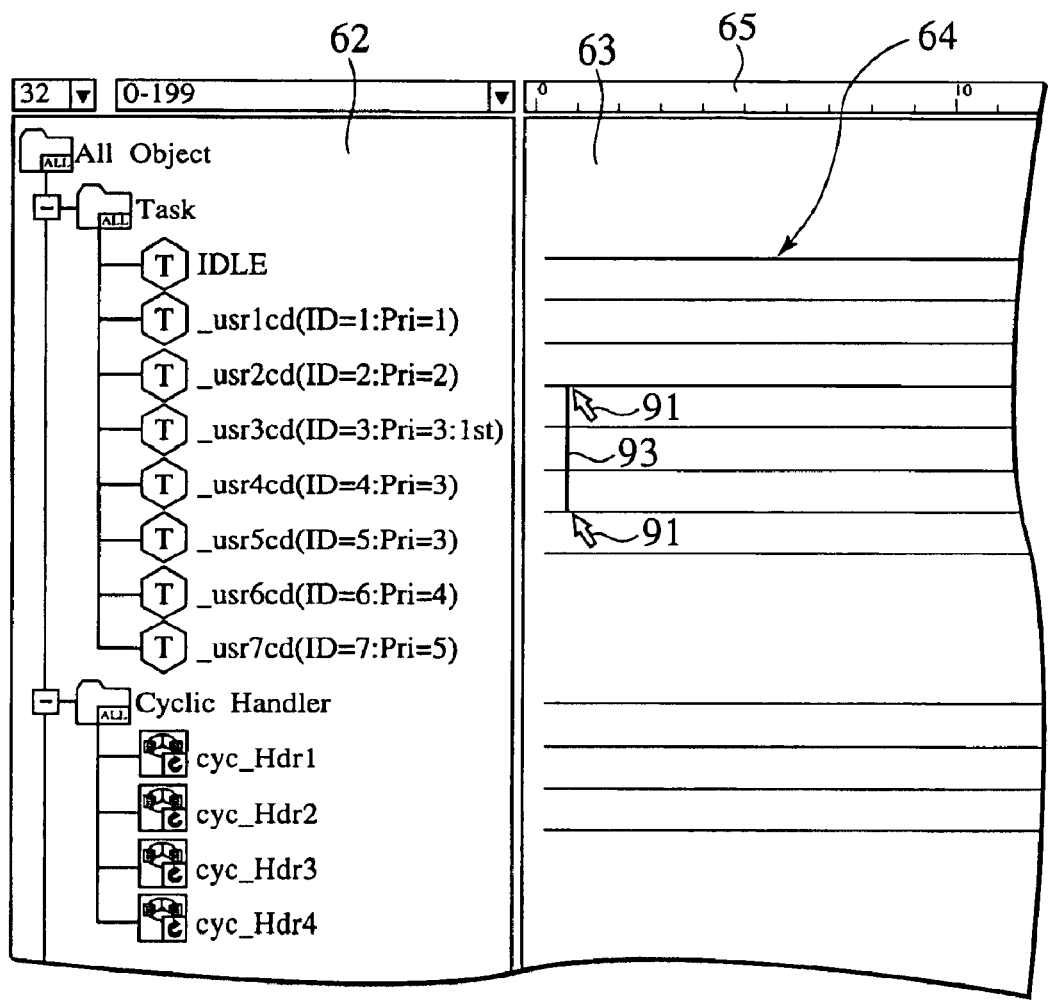
FIG. 36 is an illustrative view illustrating a screen operation when a system call is issued according to the third embodiment.

Now, an operation during a system call will be described below. Here, a description is given to an example of an adding operation in which, assuming that a programming work pane 63 is at a task section, "_usr3cd" that is an execution state task issues a system call "sta_tsk", and activates "_usr6cd" that is a pause state task. FIG. 36 is an illustrative view illustrating a screen configuration displayed on the display device 56 during a system call.

First, a system call to be issued is selected from the above described system call selection pane 61. During this selection operation, in the case where a system call selection check section 50 assumes a programming work pane 63 to be at a task section, a system call that can be issued from the task section can be selected. In the case where the check section assumes the above pane to be at a handler section, the user system call selection operation is supervised so that a system call that can be issued from that handler can be selected according to handler type.

In the present invention, the programming work pane 63 assumes a task section, and thus, a system call that can be issued only from a handler section can be selected from a system call pane 61.

From the input device 57, "sta_tsk" is selected by a system call selection pane 61. After the selection, at the programming work pane 63, a system call issuing operation is performed from the input device 57. At this time, a scale position at which a system call is issued is set to 0 because no issued system call exists. An execution state task at the scale position of 0 is "_usr3cd", and a system call issuance position 91 in the vicinity on a sequence line 64 of the "_usr3cd" task (the vicinity on the sequence line denotes a position from a sequence line on or under a target sequence line to a position close to the target sequence line) is selected from the input device 57.

A selection of a system call issuance position in this adding operation works as a function for preventing a system call from being issued by spacing intra-scales, as described previously. Functionally, even if a place indicated by a system call issuance selection position 91 is not specified as shown in FIG. 33, if the vicinity on the sequence line 64 of "_usr3cd" after the scale position of 0 is selected, the scale position: 0 is selected.

The programming device 32 that receives selection (input) causes a system call issuance position check device 35 to check the content of selection. The system call issuance position check 35 performs checks in accordance with the processing procedure shown in FIG. 37.

Figure 37:
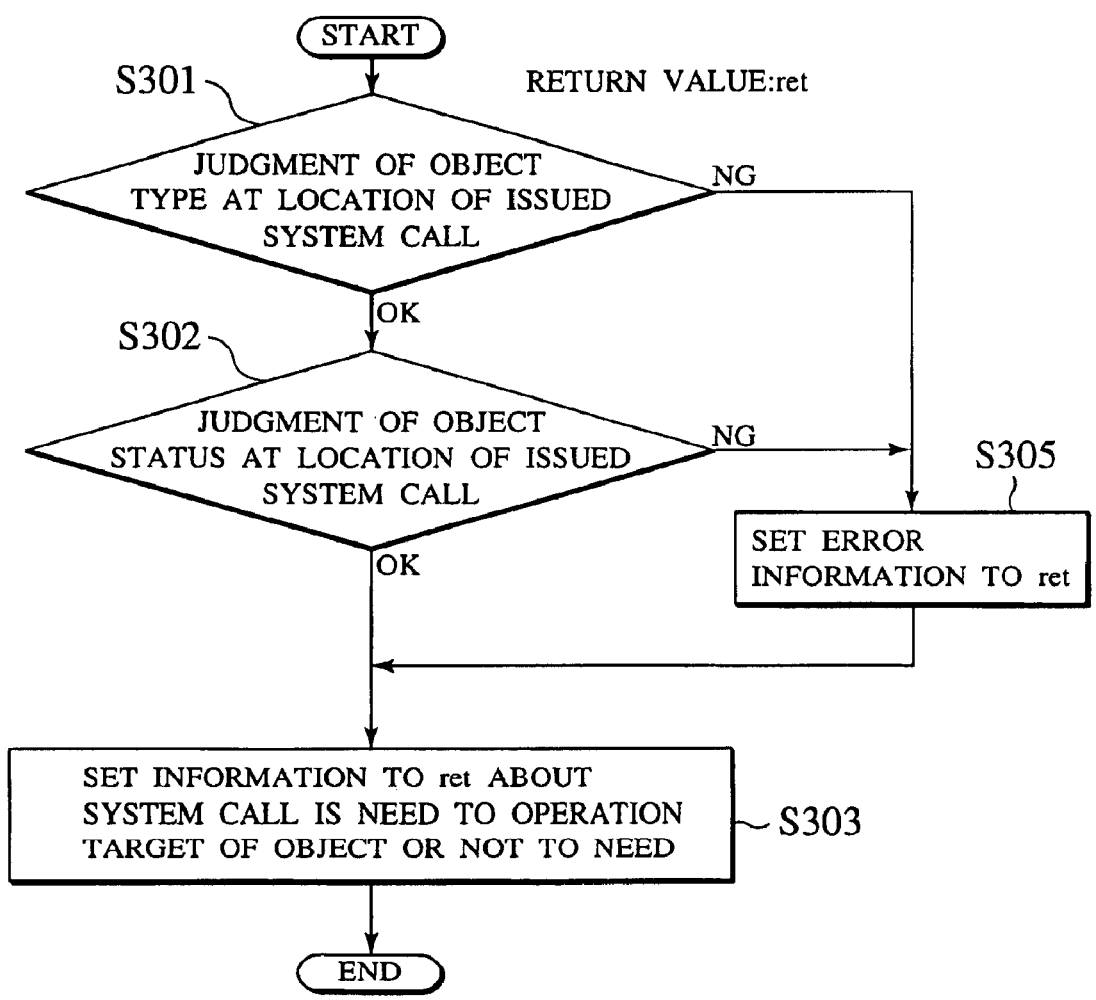
FIG. 37 is a flow chart showing a flow of checking a system call issuing position according to the third embodiment.

That is, as shown in FIG. 37, the type of object at the system call issuance position is first judged (S301). When the result is "OK", the state of object at the system call issuance position is judged (S302). When the result is "OK" at this step S302, information concerning whether or not a system call requires an object targeted for operation is supplied (S303) to return value "rat", and processing is terminated.

The return value "ret" sets information concerning whether or not a system call requires an object targeted for operation; and error information. In the present embodiment, this return value "ret" is a variable that has a 32 bit region. Information concerning whether or not a system call requires an object targeted for operation is set at the most significant bit, and the other bits are used for a region in which error information is set.

When "NG" is judged at the step S301 or step S302, error information is supplied to the return value "ret", and processing is terminated through the step S303.

By the thus obtained return value "ret", it is judged that an issued system call is "sta_tsk"; the programming device 32 is free of an error during check and judgment as the result of check of the "ret" information region set by the system call issuance position check device 35; and "sta_task" requires an operation target object. The operation object task is "_usr6cd", and a system call issuance position 91' in the vicinity on the sequence line 64 of the "_usr6cd" task is selected from the input device 57.

If the vicinity of the sequence line 64 of "cyc_Hdrl" that is a place at the system call issuance position 91 differs from that shown in FIG. 36, for example, a cycle start handler object, is selected as a system call issuance position, the system call issuance position check device 35 judges that "sta_tsk" issuance position object is improper from the RTOS specification, and error information is supplied to a "ret" information region.

In addition, in the case where the vicinity of the sequence line 64 of a task object other than system call issuance position 91 is selected as a system call issuance position, the system call issuance position check device 35 judges that the state of the system issuance task is improper (not an execution state task) from the RTOS specification, and supplies error information to the "ret" information region.

A system call operation target position selection selects a position through a drag operation by means of an input device such as mouse from the system call issuance position. At this time, as described previously, a system call operation target position has a function for selecting the vicinity on the sequence line at the same scale position as the system call issuance position. This function is designed such that a line is traced and drawn only during vertical cursor movement, and a distal end of the line is selectively positioned during drag operation from the system call issuance position, as in the display line 93 shown in FIG. 36.

The programming section 32 that has received selection (input) causes a system call operation target position check section 36 to check the content of selection. The system call operation target position check section 36 performs checks in accordance with the processing steps shown in FIG. 38.

Figure 38:
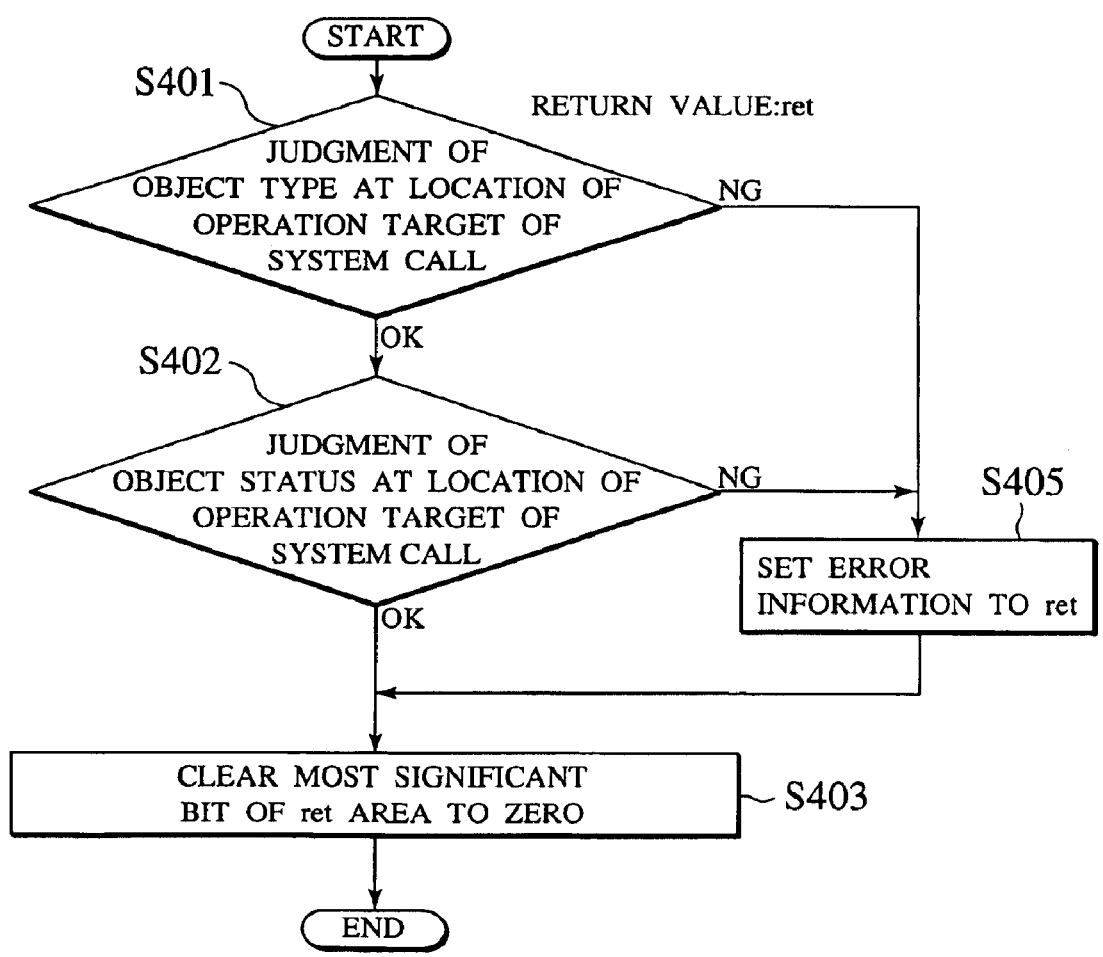
FIG. 38 is a flow chart showing a flow of checking a position targeted for system call operation according to the third embodiment.

That is, as shown in FIG. 38, the type of object at the system call operation target position of a system call operation target position is first judged (S401). When the result is "OK", the state of object at the system call operation target position is judged (S402). When the result is "OK" at this step S402, the most significant bit region of the return value "ret" is cleared. Then, the value is set to 0 (S403), and processing is terminated.

When "NG" is judged at the step S301 or step S302, error information is supplied to the return value "ret", and processing is terminated through the step S303.

By these processes, information concerning whether or not a system call set at the most significant bit of this return value "ret" requires an operation target object is cleared, and error information is set at the other bits.

During check as well, as in system call issuance position check, in the case where the vicinity of the sequence line 64 of "cyc_Hdrl" that is a place at which the system call operation target position 91' differs from that shown in FIG. 36, for example, a cycle start handler object is selected as a system call operation target position, the system call operation target position check section 36 judges that "sta_task" operation target object is improper from the RTOS specification, and error information is supplied to the "ret" information region. In addition, although a system call operation target object has selected the vicinity of the sequence line 64 of a task object other than 91' as a system call operation target position, in the case where the selected task is not a pause state task, the system call operation target position check section 36 judges that the state of the system call operation target task is improper from the RTOS specification, error information is supplied to the "ret" information region.

After the system call operation target selection position check has been completed, if no error occurs, the RTOS kernel check device 37 performs processing for functions possessed by the issued system call. In the present embodiment, "_usr6cd" that is a pause state is set to an executable state. An error judgment criterion in this processing is based on the RTOS specification.

Figure 39:
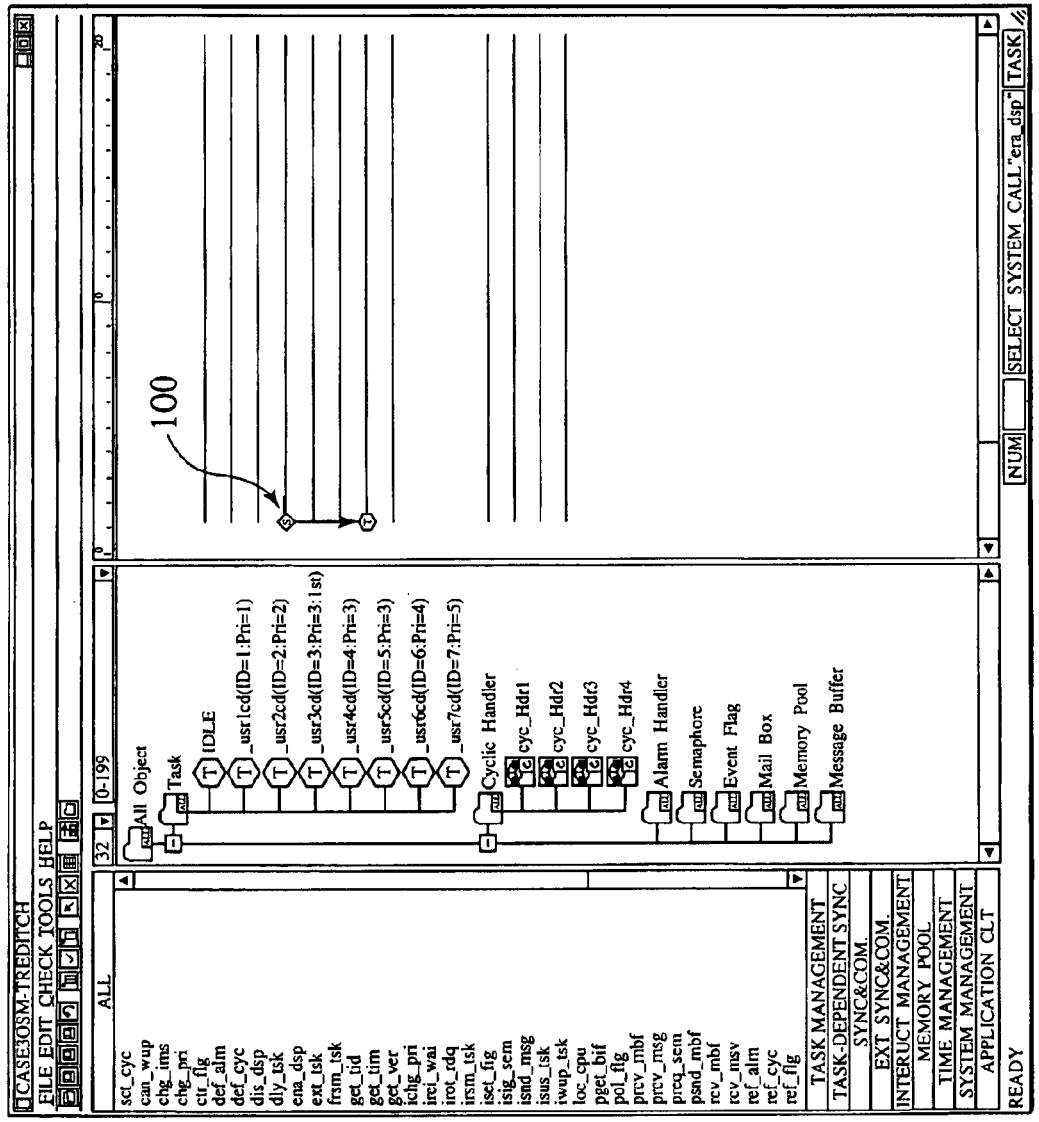
FIG. 39 is an illustrative view illustrating an execution state navigating line according to the third embodiment.

After operation for system call issuance and completion of the check, the programming device 32 updates programming information 38 and object information 39 in order to additionally draw the result of issuance on the window 70, and generates display information at a display information generator 48. Then, the window 70 updated to be drawn as shown in FIG. 39 is displayed on the display device 56.

The system call issued at the scale position: 0 and the content of issuance are stored as information in programming information 38.

In object information 39, only information on how an object has changed or object information is updated by influence of the system call issued at the scale position: 0.

Using object information 39, the programming device 32 detects execution state task information at the next scale position from the object information 39 after the end of update processing, irrespective of whether or not the object information content 39 is changed. As an execution state navigating line 100, the information is line-drawn from the system call issuance position of an issued system call to the next scale position, as shown in FIG. 39.

In addition, when an operation point such as mouse of the input device 57 is moved in the vicinity on the sequence line 64 possessed by one object by stopping drawing an issued system call that exists in the programming work pane 63, the state of the object can be displayed and referred to on the window 70 in the flow of programming processing pointed by the operation point.

After the programming device 32 has been activated, programming for "sta_task" issuance is completed by an operation inputted from the input device 57. By using this device, a check device group 45 in which the content of system call issuance is mounted on a development device performs checks in accordance with the RTOS specification to be used and object operation under the control of RTOS. Thus, at the stage of programming, it is possible to eliminate a system failure and detect a failure. By using object information 39, at the stage of programming, the state change of a task object is displayed, and the state of an object used in another application system is displayed, whereby programming can be strongly supported.

[Operation When an Event Occurs]

Figure 40:
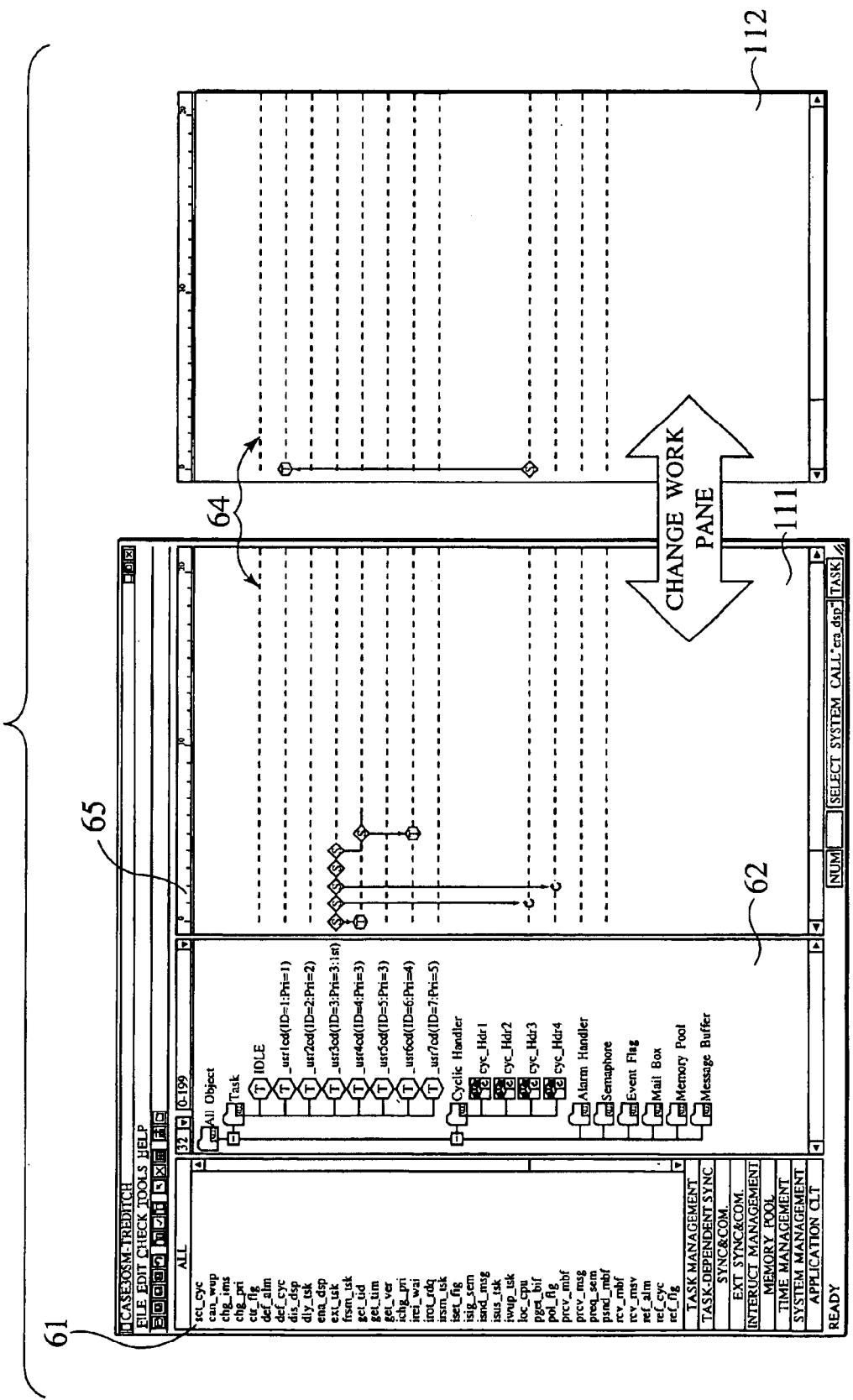
FIG. 40 is an illustrative view illustrating screen operations of task section programming work pane and a handler section programming pane according to the third embodiment.

Now, an operation when an event occurs will be described below. Here, a description will be given to an example when programming as shown in FIG. 40 is inputted from the input device 57 in the application development system 20. FIG. 40 shows a state in which programming according to the apparatus of the present invention is in progress.

According to the present embodiment, in hardware in which a development application system operates, there is shown a method for, if a periodic hardware interrupt or an asynchronous interrupt event occurs, in the case where a unit processed together with the interrupt event is programmed, defining a timing when the interrupt event occurs at the stage of programming, and checking the behavior of task used by application program and checking the change of task status.

As shown in FIG. 40, a task section programming action pane 111 performs task section programming, and a cyc_Hdrl handler section programming work pane 112 performs programming in the cyc_Hdrl handler that is a task independent section separately.

The task independent section is a processing unit when a periodic hardware interrupt or asynchronous interrupt event occurs. Synchronization with task section programming is not obtained.

Figure 41:
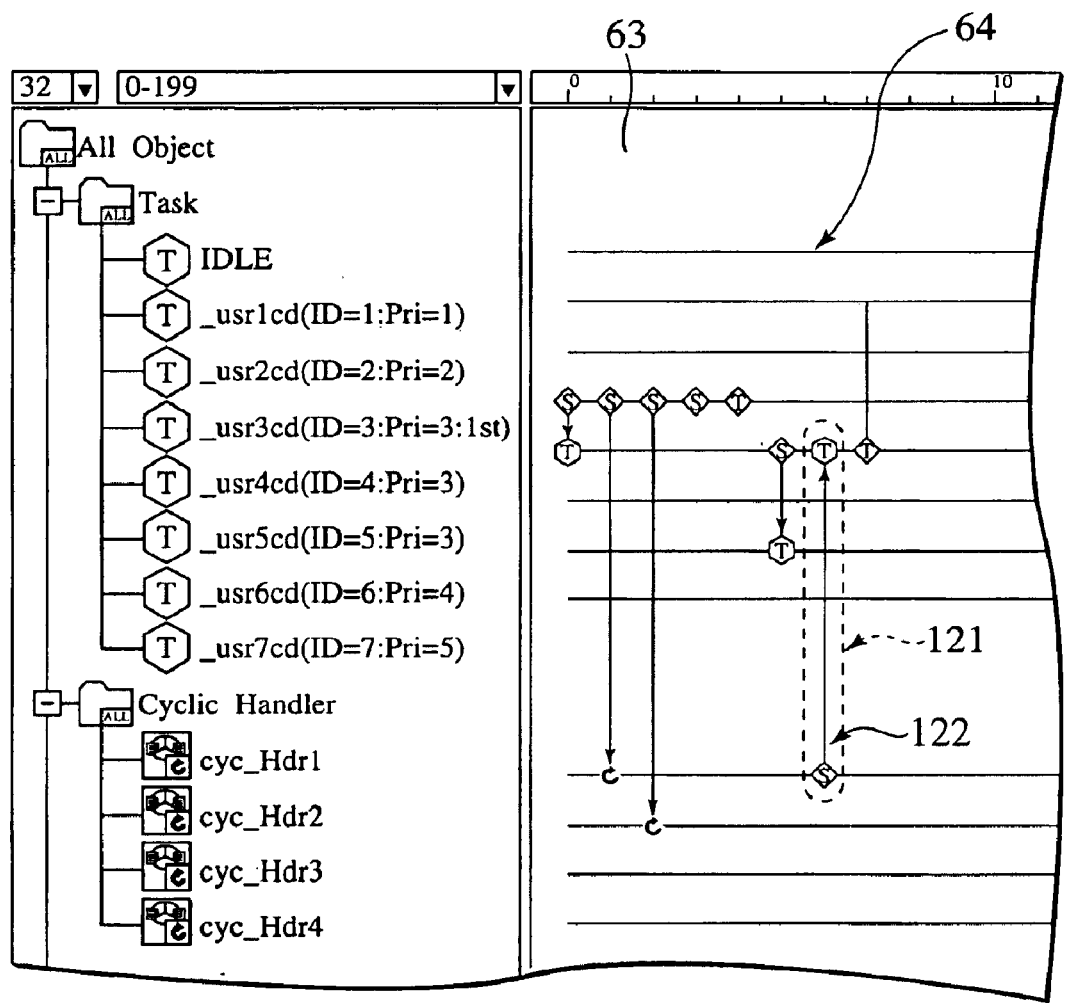
FIG. 41 is an illustrative view illustrating a screen operation when an event with which an interrupt occurs is virtually defined in programming according to the third embodiment.

In the present embodiment, as shown in FIG. 41, it is possible to check simulation if a periodic hardware interrupt or an event with which an interrupt occurs, by issuing an event with which an interrupt occurs, in which a processing unit of a cycle start handler section that is a task independent section is virtually processed at the application programming construction stage.

In order to issue an event with which an interrupt occurs, and check simulation in which a periodic hardware interrupt or asynchronous interrupt event occurs, an event with which an interrupt occurs is first issued at a scale position at which an interrupt event is caused to occur, in a programming work pane of the task section. An event with which an interrupt occurs is issued by means of the input device 57, and the programming device 32 that has received such input performs checks to be performed during system call issuance shown in the "Operation Issuing a System Call". The check contents include object type of a position at which an event with which an interrupt occurs is issued; and the state of an object.

The states of an object that causes an interrupt event to occur include system environment definition required for the statically defined object with respect to an environment definition device 31; and an operation for enabling/disabling a function of the object. Only in the case where such operation is required, dynamic operation "system call issuance" of the object is performed from the input device 57 to the programming device 32.

Figure 42:
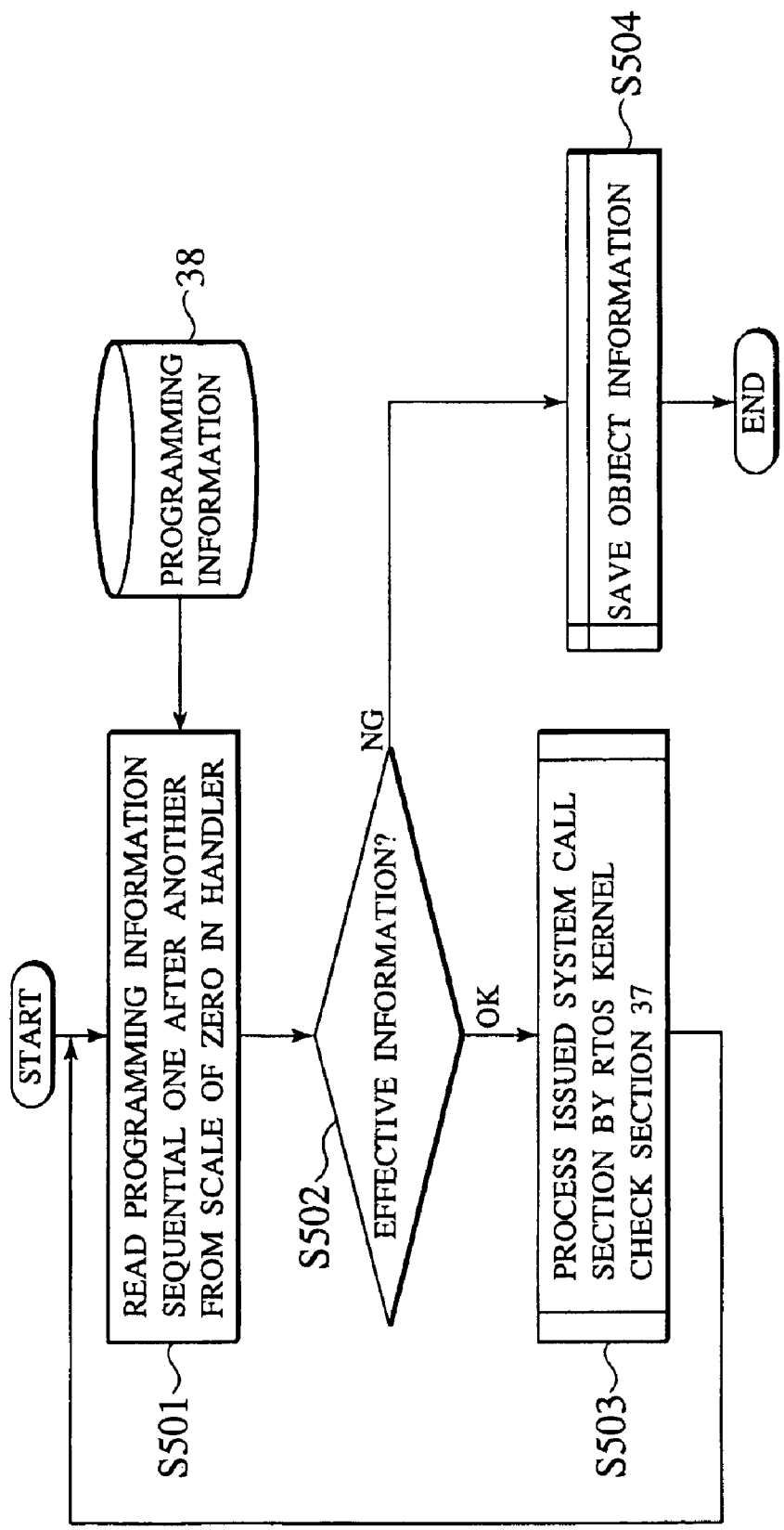
FIG. 42 is a flow chart showing a flow of processing in handler when an event with which an interrupt occurs is issued according to the third embodiment.
Figure 43:
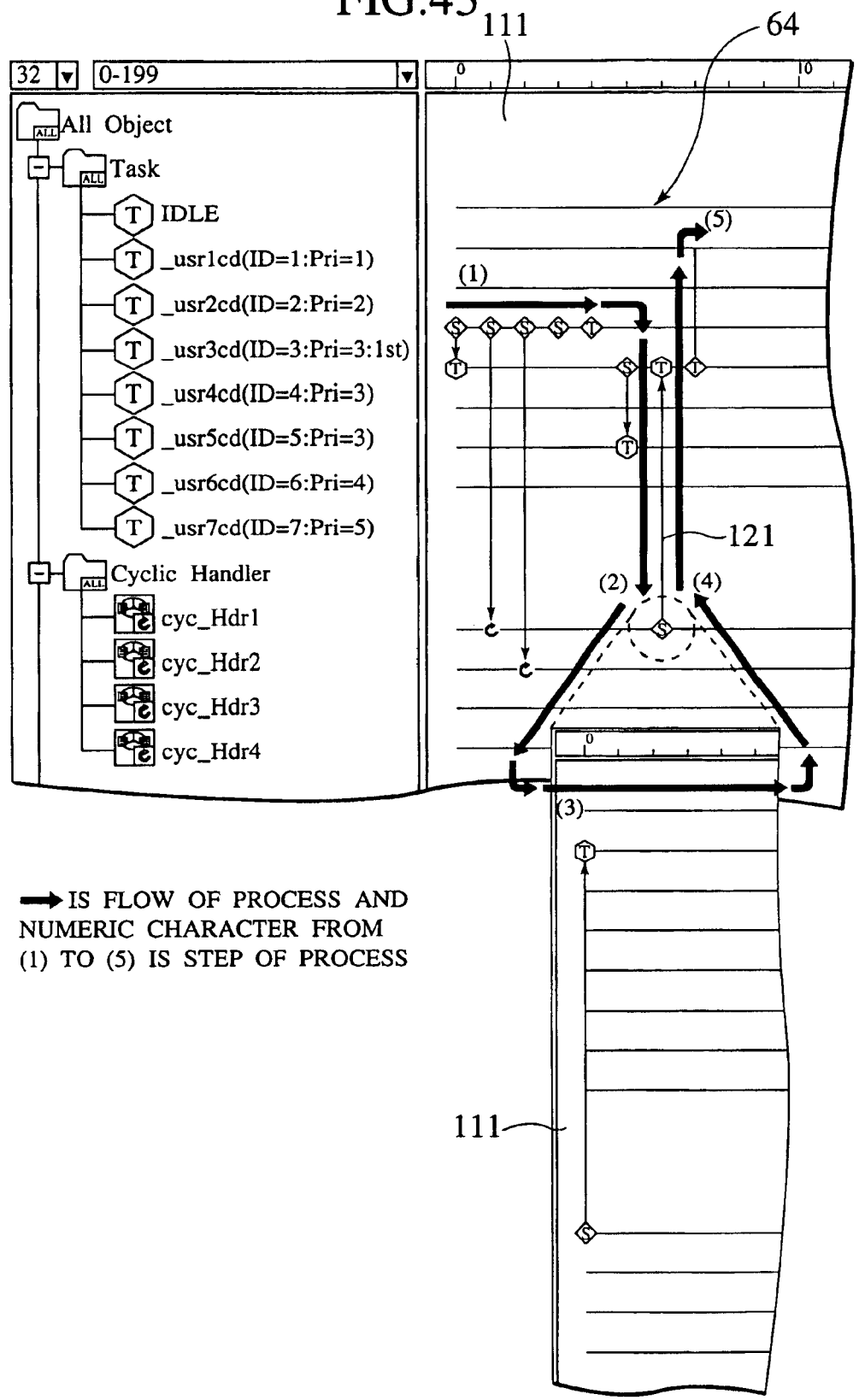
FIG. 43 is an illustrative view illustrating an operation of processing an application program when an event with which an interrupt occur is defined according to the third embodiment.

In the case where the programming device 32 judges that an event with which an interrupt occurs is correctly issued, all programming processes in a handler in which an event with which an interrupt occurs has been issued are performed in accordance with the processing steps shown in FIG. 42. As a result of the processing, a change of an object is saved in object information 39, and returns to process of the task section. FIG. 43 shows an image of application program processing.

That is, to process the program in handler, as shown in FIG. 42, programming information saved at the programming information 38 is first read sequentially from the scale position 0 (S501). Then, the presence or absence of effective information is judged (S502). If such programming information is absent in handler or all process of effective information is completed, object information 39 is saved (S504), and processing is terminated.

At the step S502, in the case where effective information is present, an issuance system call kernel section is processed at the RTOS kernel check section 37 (S503), and the step S501 and subsequent are repeated.

With such method, in the case where a state of an object that causes an interrupt event to occur is operated, and it is judged by a check group 45 that an object enters a state in which an interrupt can occur, a programming processing unit of a handler section not synchronized is defined as an interrupt event in task section programming, and then, the event can be displayed as one application system operation. Thus, at the programming stage, work can be advanced while checking a periodic interrupt that occurs with hardware or an asynchronous interrupt.

[Operation in Time Wait State]

Figure 44:
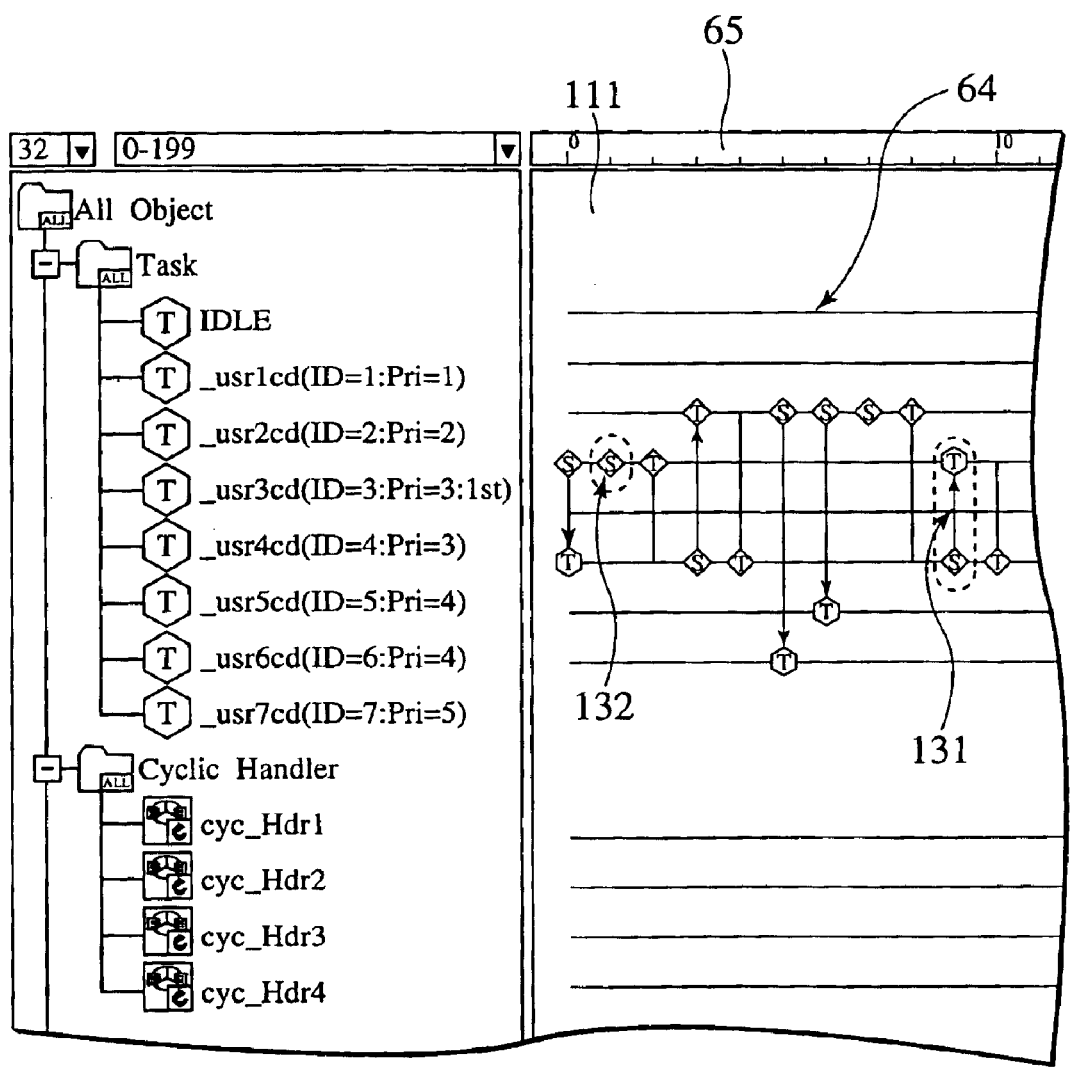
FIG. 44 is an illustrative view illustrating an operation for virtually defining an elapse of time as an event in programming according to the third embodiment.

Now, an operation in a time wait state will be described below. Here, a description will be given to an example when programming a shown in FIG. 43 and FIG. 44 is inputted from the input device 57. FIG. 43 and FIG. 44 are views each showing a screen operation in programming state according to the apparatus of the present invention.

In the present embodiment, in hardware on which a development application system operates, RTOS utilizes a time function in which hardware is mounted, and changes an execution state task to a time wait state. There is shown a method for defining a release timing of the development application system, checking the behavior of task used by application program and the change of task status.

At a task section programming work pane 111 shown in FIG. 44, a system call "dly_tsk" (task delay) is issued at a scale position: 1. With the function shown in the "Operation Issuing a System Call", an execution task "_usr3cd" that has issued "dly_tsk" changes to the time wait state.

A method for releasing a wait for a time wait state task "_usr3cd" from application program execution environment includes: issuing "rel_wai" [other task wait state release] at an arbitrary scale position; or waiting an elapse of a delay time specified when "dly_?tsk" is issued. A method for issuing "rel_wai" at an arbitrary timing, and releasing a time wait state can be achieved by the functions shown in the "Operation Issuing a System Call".

Another method for waiting for an elapse of time uses a time function mounted by hardware on which a development application system operates. Thus, operation cannot be checked at the programming stage. Then, a time-out event is issued from an execution state task at an arbitrary timing.

The issuance of a time-out event is the same as a method for issuing a system call shown in the "Operation Issuing a System Call". Namely, a task side that issues a time-out is at a system call issuance position, and an object targeted for operation corresponds to a time wait state task.

In an example shown in FIG. 44, a change to a time wait state occurs at the scale position: 1; a time-out event 131 is issued at the scale position: 9; and a time wait state of "_usr3cd" is released. In the present embodiment, it can be checked that a task object state is changed by releasing a time wait state, and an execution state task is "_usr3cd" at the scale position: 10.

According to the present invention, at the programming stage, it is possible to enable efficient application system development by visually checking the behavior of an application system in accordance with operation rules for the execution environment; finding an early programming error; and reducing a return of work steps.

The present invention has been described so far in detail. It is noted, however, that the present invention should not be limited to the embodiments stated above and that various modifications and changes can be made within the scope of the invention. For example, in the above embodiments, attention is paid to the state of the task at the end of events (when the program processing is finished) and the cause of a defect is analyzed. The noted point should not be limited thereto and a user can pay attention to an arbitrary point and analyze the cause of the defect.

Further, the above embodiments have been described while taking the ITRON-compliant application program as an example. The present invention should not be limited to such a real-time OS and can be widely applied to programs which normally operate according to the multitask scheme.

What is claimed is:

1. An information processing apparatus for testing and debugging multitask programs operating on a real-time operation system, comprising:

user interface means for displaying an operation state of a program by an X-Y coordinate with respect to an X-axis value representing timings of events and a Y-axis value representing tasks, to a user in a time-series manner based on program execution history information, and for receiving a portion of a defect pointed out by the user in the displayed operation state; and operation analysis means for analyzing a cause of the defect from a timing and a task of the defect pointed out from the user by said user interface means and from the operation state of the program, and for specifying a solution for solving the cause of the defect, wherein said operation analysis means regenerates an operation state on which said solution is reflected; and said user interface means displays said cause of the defect, said solution and the regenerated operation state to the user.

2. An information processing apparatus comprising:

user interface means for displaying an operation state of a program to a user in a time-series manner based on program execution history information, and for receiving a portion of a defect pointed out by the user in the displayed operation state; and operation analysis means for analyzing a cause of the defect from the portion of the defect pointed out from the user by said user interface means and from the operation state of the program, wherein if said operation analysis means cannot specify a portion in which a solution is reflected on the operation state, said information processing apparatus further urges the user to designate another portion of the defect on the operation state;

said operation analysis means regenerates an operation state on which the solution is reflected in the other portion designated by the user; and said user interface means displays said cause of the defect, the solution and the regenerated operation state to the user.

3. An information processing apparatus according to claim 2, wherein said information processing apparatus has program function correspondence information for specifying said solution.

4. An information processing apparatus according to claim 2, wherein said user interface means uniquely identifies the portion of the defect by allowing the user to designate the portion of the defect by a coordinate position.

5. An information processing apparatus according to claim 2, wherein said information processing apparatus further automatically generates a program skeleton satisfying an original specification based on said solution and said execution history information.

6. A recording medium having a defect analysis program to be executed by a computer to test and debug multitask programs operating on a real-time operating system, comprising the steps of:

displaying an operation state of a program by an X-Y coordinate with respect to an X-axis value representing timings of events and a Y-axis value representing tasks, to a user in a time-series manner based on program execution history information;

analyzing a cause of a defect from a timing and a task of the defect designated by the user and from the operation state of the program, and specifying a solution for solving the cause of the defect;

regenerating operation state on which said solution is reflected; and displaying said cause of the defect, said solution and the regenerated operation state to the user.

7. A recording medium having a defect analysis program for allowing a computer to realize the steps of:

displaying an operation state of a program to a user in a time-series manner based on program execution history information;

analyzing a cause of a defect from a portion of the defect designated by the user and from the operation state of the program, and urging the user to designate another portion of the defect if a portion in which the solution is reflected on said operation state cannot be specified;

regenerating an operation state on which the solution is reflected in the other portion; and displaying said cause of the defect, said solution and the regenerated operation state to the user.

8. A recording medium according to claim 7, wherein the defect analysis program allows the computer to specify said solution by using a program function correspondence information table.

9. A recording medium according to claim 7, wherein the defect analysis program further allows the computer to realize a function to automatically generate a program skeleton satisfying an original specification based on said solution and said execution history information.

10. A defect analysis method for testing and debugging multitask programs operating on a real-time operating system, comprising the steps of:

displaying an operation state of a program by an X-Y coordinate with respect to an X-axis value representing timings of events and a Y-axis value representing tasks, to a user in a time-series manner based on program execution history information;

analyzing a cause of a defect from a timing and a task of the defect designated by the user and from the operation state of the program, and specifying a solution for solving the cause of the defect;

regenerating operation state on which said solution is reflected; and displaying said cause of the defect, said solution and the regenerated operation state to the user.

11. A defect analysis method comprising the steps of:

displaying an operation state of a program to a user in a time-series manner based on program execution history information;

analyzing a cause of a defect from a portion of the defect designated by the user and from the operation state of the program, and urging the user to designate another portion of the defect if a portion in which the solution is reflected on said operation state cannot be specified;

regenerating an operation state on which the solution is reflected in the other portion; and displaying said cause of the defect, said solution and the regenerated operation state to the user.

12. A defect analysis method according to claim 11, wherein said solution is specified by using a program function correspondence information table.

13. A defect analysis method according to claim 11, further comprising the step of:

automatically generating a program skeleton satisfying an original specification based on said solution and said execution history information.

* * * * *